United States Patent
Sharifi Mehr

(10) Patent No.: US 10,063,590 B1
(45) Date of Patent: Aug. 28, 2018

(54) SECURE MESSAGE PROTOCOL

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 14/694,987

(22) Filed: Apr. 23, 2015

(51) Int. Cl.
*H04L 29/06* (2006.01)

(52) U.S. Cl.
CPC ........ *H04L 63/166* (2013.01); *H04L 63/0281* (2013.01); *H04L 63/0428* (2013.01); *H04L 63/06* (2013.01); *H04L 63/061* (2013.01); *H04L 63/126* (2013.01); *H04L 63/1441* (2013.01)

(58) Field of Classification Search
CPC . H04L 63/0281; H04L 63/0428; H04L 63/06; H04L 63/061; H04L 63/126; H04L 63/1441; H04L 63/166
USPC .......................................................... 713/154
See application file for complete search history.

(56) References Cited

U.S. PATENT DOCUMENTS

| | | | | |
|---|---|---|---|---|
| 6,430,184 B1* | 8/2002 | Robins | ............... | H04L 12/5601 370/392 |
| 8,136,025 B1* | 3/2012 | Zhu | ................... | G06F 17/30864 707/634 |
| 9,100,245 B1* | 8/2015 | Andrews | ........... | H04L 29/06836 |
| 9,749,305 B1* | 8/2017 | Sharifi Mehr | .......... | H04L 63/08 |
| 9,781,081 B1* | 10/2017 | Wasiq | ................. | H04L 63/0428 |
| 2004/0103279 A1* | 5/2004 | Alten | .................. | H04L 63/0428 713/160 |
| 2006/0062393 A1* | 3/2006 | Hsu | ....................... | H04L 9/0861 380/281 |
| 2008/0104390 A1* | 5/2008 | VanHeyningen | ......... | H04L 9/12 713/151 |
| 2011/0231935 A1* | 9/2011 | Gula | .................... | H04L 43/028 726/25 |
| 2012/0166582 A1* | 6/2012 | Binder | ................... | H04L 63/18 709/217 |
| 2012/0209971 A1* | 8/2012 | Howe | ................. | H04L 63/0428 709/223 |

(Continued)

OTHER PUBLICATIONS

Wiley, B., "Dust: A Censorship-Resistant Internet Transport Protocol," The University of Texas at Austin School of Information, GitHub, <https://github.com/blanu/Dust> [retrieved Apr. 28, 2015], 2 pages.

(Continued)

*Primary Examiner* — Harunur Rashid
*Assistant Examiner* — Sakinah W Taylor
(74) *Attorney, Agent, or Firm* — Davis Wright Tremaine LLP

(57) ABSTRACT

Observable characteristics of an encrypted data transmission can be analyzed and used to make inferences about the content of the data transmission. This information leakage is reduced by obscuring the observable characteristics of the data transmission. An obscuring engine is installed into the networking stack of a computer system that performs data transmission operations. The obscuring engine performs a variety of obscuring operations to obscure characteristics of the data transmission. The obscuring operations can include altering the size, packet ordering, packet partitioning, packet timing, and structure of the data transmission.

20 Claims, 23 Drawing Sheets

(56) References Cited

U.S. PATENT DOCUMENTS

| | | | | |
|---|---|---|---|---|
| 2013/0139263 | A1* | 5/2013 | Beyah | H04L 63/1408 726/23 |
| 2013/0188644 | A1* | 7/2013 | Chen | H04L 65/607 370/392 |
| 2014/0195797 | A1* | 7/2014 | du Toit | H04L 63/168 713/152 |
| 2014/0337614 | A1* | 11/2014 | Kelson | H04L 63/168 713/152 |
| 2016/0119299 | A1* | 4/2016 | Amulothu | H04L 63/0485 380/255 |
| 2016/0119304 | A1* | 4/2016 | Lelcuk | H04L 63/08 726/3 |
| 2017/0118176 | A1* | 4/2017 | Okhravi | H04L 63/0428 |

OTHER PUBLICATIONS

Dierks et al., "The TLS Protocol: Version 1.0," The Internet Society, Network Working Group Request for Comments: 2246, Category: Standards Track, Jan. 1999, 80 pages.

Newman, "Using TLS with IMAP, POP3, and ACAP," The Internet Society, Network Working Group Request for Comments: 2595, Category: Standards Track, Jun. 1999, 15 pages.

Medvinsky et al., "Addition of Kerberos Cipher Suites to Transport Layer Security (TLS)," The Internet Society, Network Working Group Request for Comments: 2712, Category: Standards Track, Oct. 1999, 7 pages.

Khare et al., "Upgrading to TLS Within HTTP/1.1," The Internet Society, Networking Working Group Request for Comments: 2817, Category: Standards Track, May 2000, 13 pages.

Rescorla et al., "HTTP Over TLS," The Internet Society, Network Working Group Request for Comments: 2818, Category: Informational, May 2000, 7 pages.

Hoffman et al., "SMTP Service Extension for Secure SMTP over Transport Layer Security," The Internet Society, Network Working Group Request for Comments: 3207, Category: Standards Track, Feb. 2002, 9 pages.

Chown et al., "Advanced Ecryption Standard (AES) Ciphersuites for Transport Layer Security (TLS)," The Internet Society, Network Working Group Request for Comments: 3268, Category: Standards Track, Jun. 2002, 7 pages.

Blake-Wilson et al., "Transport Layer Security (TLS) Extensions," The Internet Society, Network Working Group Request for Comments: 3546, Category: Standards Track, Jun. 2003, pp. 1-29.

Hollenbeck, "Transport Layer Security Protocol Compression Methods," The Internet Society, Network Working Group Request for Comments: 3749, Category: Standards Track, May 2004, 8 pages.

Friend et al., "Transport Layer Security (TLS) Protocol Compression Using Lempel-Ziv-Stac (LZS)," The Internet Society, Network Working Group Request for Comments: 3943, Nov. 2004, 13 pages.

Moriai et al., "Addition of Camellia Cipher Suites to Transport Layer Security (TLS)," The Internet Society, Network Working Group Request for Comments: 4132, Category: Standards Track, Jul. 2005, 7 pages.

Lee et al., "Addition of the Seed Cipher Suites to Transport Layer Security (TLS)," The Internet Society, Network Working Group Request for Comments: 4162, Category: Standards Track, Aug. 2005, 6 pages.

Ford-Hutchinson et al., "Securing FTP with TLS," The Internet Society, Network Working Group Request for Comments: 4217, Oct. 2005, 29 pages.

Eronen et al., "Pre-Shared Key Ciphersuites for Transport Layer Security (TLS)," The Internet Society, Network Working Group Request for Comments: 4279, Cateogry: Standards Track, Dec. 2005, 15 pages.

Rescorla et al., "Datagram Transport Layer Security," The Internet Society, Network Working Group Request for Comments: 4347, Category: Standards Track, Apr. 2006, 25 pages.

Blake-Wilson et al., "Transport Later Security (TLS) Extensions," The Internet Society, Network Working Group Request for Comments: 4366, Category: Standards Track, Apr. 2006, pp. 1-30.

Blake-Wilson et al., "Elliptic Curve Crypotgraphy (ECC) Cipher Suites for Transport Layer Security (TLS)," The Internet Society, Network Working Group Request for Comments: 4492, Category: Informational, May 2006, pp. 1-35.

Santesson, "TLS Handshake Message for Supplemental Data," The Internet Society, Network Working Group Request for Comments: 4680, Category: Standards Track, Sep. 2006, 9 pages.

Santesson et al., "TLS User Mapping Extension," The Internet Society, Network Working Group Request for Comments: 4681, Category: Standards Track, Oct. 2006, 11 pages.

Blumenthal et al., "Pre-Shared Key (PSK) Ciphersuites with NULL Encryption for Transport Layer Security (TLS)," The IETF Trust, Network Working Group Request for Comments: 4785, Category: Standards Track, Jan. 2007, 5 pages.

Taylor et al., "Using the Secure Remote Password (SRP) Protocol for TLS Authentication," Network Working Group Request for Comments: 5054, Category: Informational, Nov. 2007, 24 pages.

Salowey et al., "Transport Layers Security (TLS) Session Resumption without Server-Side State," Network Working Group Request for Comments: 5077, Category: Standards Track, Jan. 2008, 20 pages.

Mavrogiannopoulos, "Using OpenPGP Keys for Transport Layer Security (TLS) Authentication," Network Working Group Request for Comments: 5081, Category: Experimental, Nov. 2007, 8 pages.

Phelan et al., "Datagram Transport Layer Security (DTLS) over the Datagram Congestion Control Protovol (DCCP)," Network Working Group Request for Comments: 5238, Category: Standards Track, May 2008, 10 pages.

Dierks et al., "The Transport Layer Security (TLS) Protocol: Version 1.2," Network Working Group Request for Comments: 5246, Category: Standards Track, Aug. 2008, 104 pages.

Salowey et al., "AES Galois Counter Mode (GCM) Cipher Suites for TLS," Network Working Group Request for Comments: 5288, Category: Standards Track, Aug. 2008, 8 pages.

Rescorla et al., "TLS Elliptic Curve Cipher Suites with SHA-256/384 and AES Galois Counter Mode (GCM)," Network Working Group Request for Comments: 5289, Category: Informational, Aug. 2008, 6 pages.

Rescorla et al., "Transport Layer Security (TLS) Renegotiation Indication Extension," IETF Trust, Internet Engineering Task Force (IETF) Request for Comments: 5746, Category: Standards Track, Feb. 2010, 15 pages.

McGrew et al., "Datagram Transport Layer Security (DTLS) Extension to Establish Keys for the Secure Real-time Transport Protocol (SRTP)," IETF Trust, Internet Engineering Task Force (IETF) Request for Comments: 5764, May 2010, 26 pages.

Brown et al., "Transport Layer Security (TLS) Authorization Extensions," Internet Engineering Task Force (IETF) Request for Comments: 5878, Cateogry: Experimental, May 2010, 19 pages.

Kato et al., "Camellia Cipher Suites for TLS," IETF Trust, Internet Engineering Task Force (IETF) Request for Comments: 5932, Category: 4132, Category: Standards Track, Jun. 2010, 6 pages.

Tuexen et al., "Datagram Transport Layer Security (DTLS) for Stream Control Transmission Protocol (SCTP)," IETF Trust, Internet Engineering Task Force (IETF) Request for Comments: 6083, Category: Standards Track, Jan. 2011, 9 pages.

Eastlake 3rd, "Transport Layer Security (TLS) Extensions: Extension Definitions," Internet Engineering Task Force (IETF) Request for Comments: 6066, Category: 4366, Jan. 2011, 25 pages.

Mavrogiannopoulos et al., "Using OpenPGP Keys for Transport Layer Security (TLS) Authentication," Request for Comments: 6091, Informational, Feb. 2011, 9 pages.

Turner et al., "Prohibiting Secure Sockets Layer (SSL) Version 2.0," IETF Trust, Internet Engineering Task Force (IETF) Request for Comments: 6176, Mar. 2011, 4 pages.

Kim et al., "Addition of the ARIA Cipher Suites to Transport Layer Security (TLS)," IETF Trust, Internet Engineering Task Force (IETF) Request for Comments: 6209, Category: Informational, Apr. 2011, 9 pages.

(56) References Cited

OTHER PUBLICATIONS

Rescorla et al., "Datagram Transport Layer Security Version 1.2," IETF Trust, Internet Engineering Task Force (IETF) Request for Comments: 6347, Category: Standards Track, Jan. 2012, 32 pages.

Kanno et al., "Addition of the Camellia Cipher Suites to Transport Layer Security (TLS)," IETF Trust, Internet Engineering Task Force (IETF) Request for Comments: 6367, Category: Informational, Sep. 2011, 8 pages.

Salter et al., "Suite B Profil for Transport Layer Security (TLS)," IETF Trust, Internet Engineering Task Force (IETF) Request for Comments: 6460, Category: Informational, Jan. 2012, 14 pages.

McGrew et al., "AES-CCM Cipher Suties for Transport Layer Security (TLS)," IETF Trust, Internet Engineering Task Force (IETF) Request for Comments: 6655, Category: Standards Track, Jul. 2012, 8 pages.

Merkle et al., "Elliptic Curve Cryptography (ECC) Brainpool Curves for Transport Layer Security (TLS)," IETF Trust, Internet Engineering Task Force (IETF) Request for Comments: 7027, Category: Informational, Oct. 2013, 10 pages.

Gutmann et al., "Encrypt-then-MAC for Transport Layer Security (TLS) and Datagram Transport Layer Security (DTLS)," IETF Trust, Internet Engineering Taskforce (IETF) Request for Comments: 7366, Category: Standards Track, Sep. 2014, 7 pages.

\* cited by examiner

SECURE MESSAGE PROTOCOL

BACKGROUND

Secure transport protocols such as Secure Sockets Layer/Transport Layer Security ("SSL/TLS"), and Secure Shell ("SSH") are used to establish communication channels that protect the confidentiality of transmitted messages using encryption. However, even encrypted messages transferred using these protocols sometimes provide information about the data being transferred. For example, when a customer is relying on HTTP over SSL/TLS ("HTTPS") for browsing a website, the size of the associated SSL/TLS encrypted records and the amount of time between record transfers can, in some cases, be used to identify the particular Web pages visited.

The structural formats of encrypted messages in various schemes are commonly public knowledge (i.e. documented in RFC standards). For example, in an envelope-based encryption scheme, data records are encrypted using Data Encryption Keys ("DEKs") which are generated randomly. Then DEKs are encrypted using a Key Encrypting Key ("KEK") which is pre-shared among parties authorized to access the encrypted data records. The structure of an encrypted data record will include plain text metadata (i.e. KEK's identifier) and an encrypted body which is concatenation of the encrypted DEK and the encrypted original data. Therefore, a cryptanalyst can know which bytes within the encrypted body contain the encrypted key used for the encryption of the rest of message.

BRIEF DESCRIPTION OF THE DRAWINGS

Various embodiments in accordance with the present disclosure will be described with reference to the drawings, in which.

DETAILED DESCRIPTION

Figure 1:
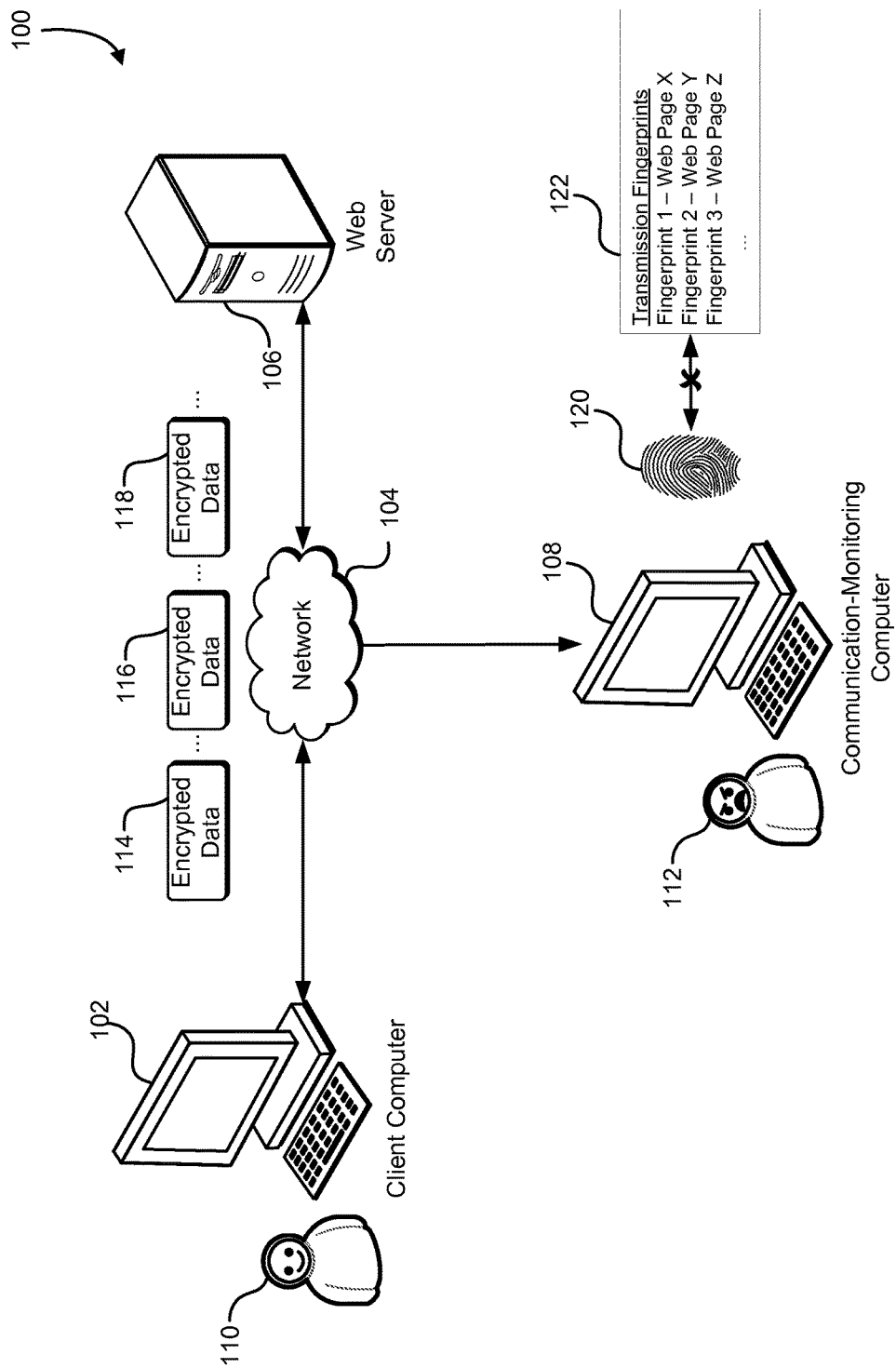
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods that reduce information leakage from encrypted transmissions. For example, when an encrypted message is transmitted over SSL/TLS, the length of the message can generally be determined through analysis of the characteristics of the encrypted transmission even though the content of the message remains securely encrypted. The length of the message may, in certain situations, reveal the nature of the encrypted transmission. For example, an eavesdropper could access a website and determine the size of each webpage. When a person connects to the website using an encrypted connection and accesses a particular webpage, the eavesdropper can compare the size of the transmission to the known sizes of each webpage and determine the particular webpage that the person accessed.

The current document discloses an obscuring engine which obscures characteristics of encrypted transmissions that, in certain situations, cause information leakage. In various implementations, the obscuring engine is installed into a networking stack of a computer system. When data is transmitted using an encrypting network protocol such as SSL/TLS, the data transmission passes through the obscuring engine before it leaves the computer system.

In some implementations, the obscuring engine on the sending machine negotiates with an obscuring engine on a receiving computer system. The negotiation determines a set of obscuring capabilities and obscuration parameters that are mutually supported by the sender and the receiver, and a selection of the mutually supported obscuring capabilities are used to obscure the data transmission. As the secure SSL/TLS data stream passes through the obscuring engine on the sending machine, various characteristics and/or fingerprints of the transmission are obscured. When the obscured data stream is received at the receiving machine, the data stream passes through the receiver's obscuring engine, and the SSL/TLS data stream is restored (if necessary), before the data stream is passed to the SSL/TLS protocol handler for decryption. The characteristics of the encrypted transmission are obscured, and information leakage is reduced.

In additional implementations, the obscuring engine is integrated into a secure protocol such as SSL/TLS. In the case of SSL/TLS, the TLS handshake can be extended to include communicating the obscuring capabilities of the sender and the receiver. The obscuring operations are compatible with a variety of TLS/SSL cipher suites, and can be implemented in isolation from the particular implementation of the cipher suites.

Various implementations of the obscuring engine are described including obscuring engines that process packet-based transmissions as well as stream-based transmissions. Each obscuring engine can support a selection of obscuring operations that include key relocation, packet repartitioning, packet reordering, padding injection, and modification of transmission cadence. When a connection is established between two obscuring engines, the obscuring engines communicate their obscuring capabilities, and determine an appropriate combination of obscuration parameters to employ using a number of inputs that include: whether the encrypted transmission is stream-based or packet-based; the length of the transmission; performance requirements of the transmission; the amount of buffering memory available for the transmission; and the obscuring capabilities of each obscuring engine. The obscuration parameters identify the particular obscuring operations to be performed, as well as the parameters associated with each operation such as record size, record order, and time between record transfers.

FIG. 1 shows an illustrative example of an environment in which various embodiments may be practiced. Environment 100 includes a client computer 102 connected via a network 104 to a Web server 106. A communication-monitoring computer 108 is connected to the network 104, and monitors communications between the client computer 102 and the Web server 106.

When a user 110 initiates an encrypted transmission from the client computer 102 to the Web server 106, an eavesdropper 112 monitors the encrypted transmission with the communication-monitoring computer 108. The eavesdropper 112 cannot, in general, read the content of the encrypted transmission. However, the encrypted transmission includes a sequence of encrypted data packets 114, 116, and 118. In some situations, the characteristic size, ordering and timing of the sequence encrypted data packets can reveal information about the underlying encrypted transmission. By generating a fingerprint 120 based at least in part on characteristics of the sequence of encrypted data packets, the eavesdropper can infer various information about the transmission by comparing the fingerprint to the fingerprints of other known transmissions 122. For example, the overall size of the transmission may reveal significant information about what the transmission is. The size and timing of the packets that make up the transmission can be analyzed to create a fingerprint that can be compared to the fingerprint of other transmissions. In this way, an attacker may be able to identify what is in an unknown transmission by comparing the fingerprint 120 of the unknown transmission to fingerprints of other known transmissions 122, or in some situations, identify that a particular type of transmission has recurred. In certain situations, an attacker will utilize known information about an encryption protocol to attack a critical part of the message with a cryptographic attack.

Many networking technologies and protocols are built on a principle of breaking a transmission into a number of records or data packets. The particular size and ordering of the packets can be used, in some attack scenarios, to determine various characteristics of an encrypted transmission. Even the timing between message packets that make up an encrypted transmission can enable an eavesdropper to determine characteristics of the encrypted transmission. In certain environments, the timing of message packets, or cadence, allows an eavesdropper to create a traceable fingerprint associated with a particular encrypted transmission. In many situations, these and other forms of information leakage are reduced when the characteristics of the encrypted transmission are deliberately obscured using techniques described herein.

Figure 2:
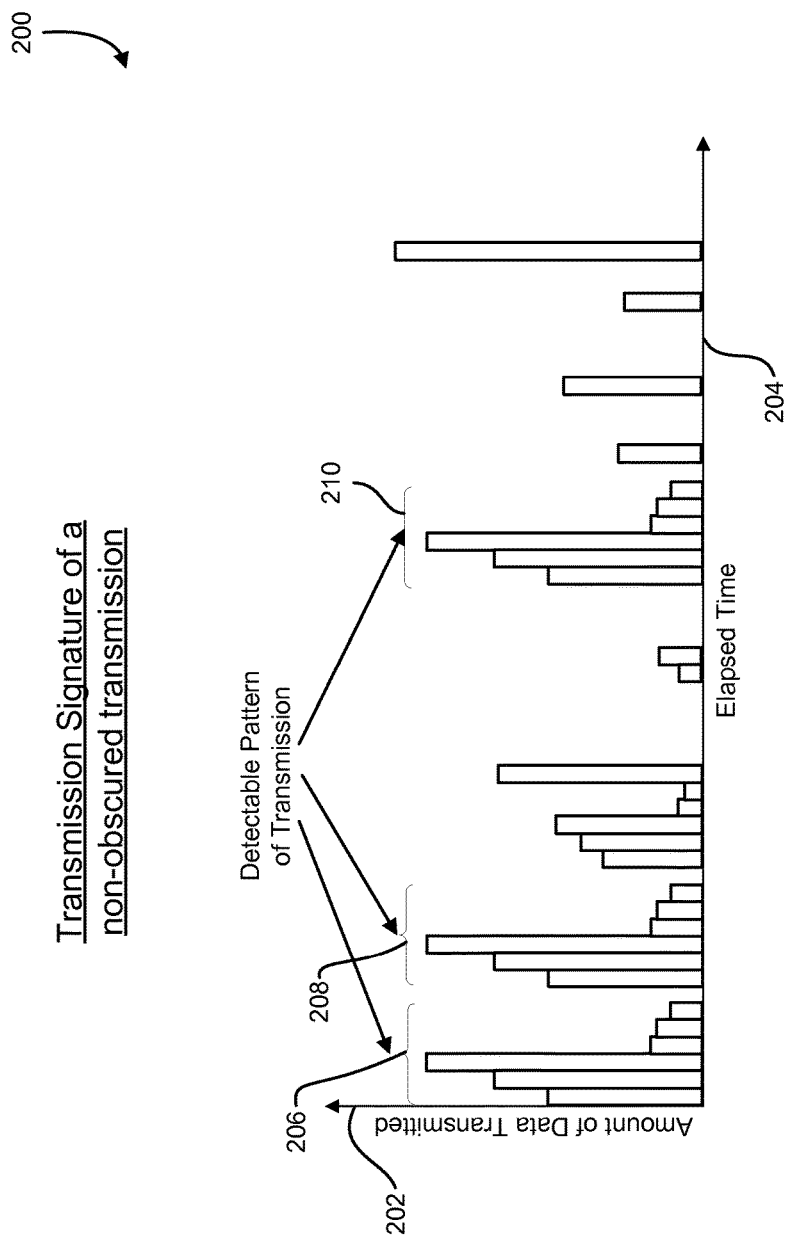
FIG. 2 shows an illustrative example of a transmission fingerprint of a non-obscured transmission, in accordance with an embodiment.

FIG. 2 shows an illustrative example of a transmission fingerprint of a non-obscured transmission, in accordance with an embodiment. An unobscured transmission-fingerprint bar graph 200 has an X-axis 202 showing an amount of data transmitted and a Y-axis 204 showing elapsed time. Vertical bars represent the amount of data transmitted during each time interval. Three regions, 206, 208, and 210, identify a repeating pattern of transmission. Even when the underlying data is encrypted, repeating patterns such as those identified in the unobscured transmission-fingerprint bar graph 200 can sometimes be used to identify or determine characteristics of the encrypted transmission.

For example, regions 206, 208, and 210 might represent access to a particular webpage or access to a particular web service. An eavesdropper could identify this pattern by accessing the particular webpage with a particular web service, storing a characteristic pattern, and comparing the characteristic pattern to the transmission fingerprint of the encrypted transmission. In this way, the eavesdropper can determine the nature of the encrypted transmission even when the content of the encrypted transmission is not known.

Figure 3:
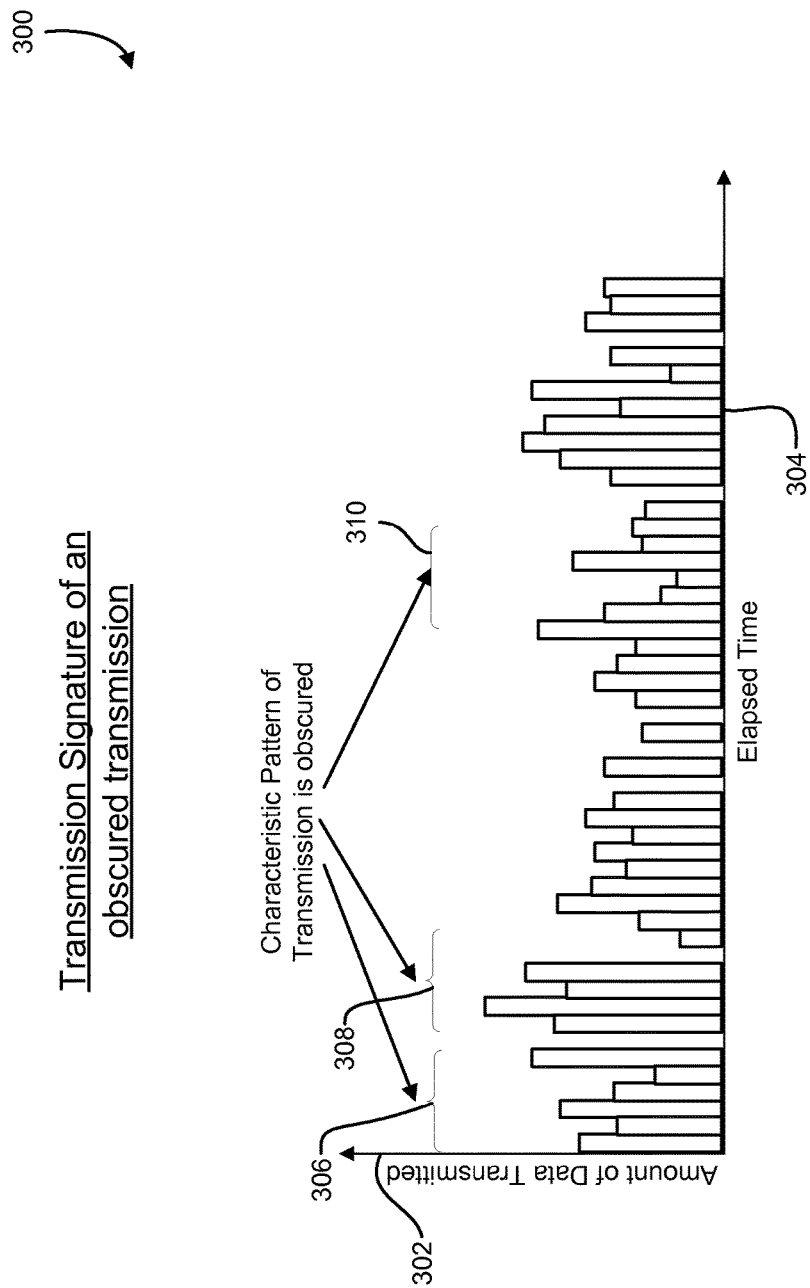
FIG. 3 shows an illustrative example of a transmission fingerprint of an obscured transmission, in accordance with an embodiment.

FIG. 3 shows an illustrative example of a transmission fingerprint of an obscured transmission, in accordance with an embodiment. An obscured transmission-fingerprint bar graph 300 has an X-axis 302 showing an amount of data transmitted and a Y-axis 304 showing elapsed time. Vertical bars represent the amount of data transmitted during each time interval. Three regions, 306, 308, and 310 correspond to the regions 206, 208, and 210 in FIG. 2. The characteristic pattern of transmission associated with the regions of FIG. 2 is obscured and the corresponding regions 306, 308, and 310 to not have readily apparent similarities. An eavesdropper, monitoring the encrypted transmission depicted in FIG. 3, would find it more difficult to identify a repeating characteristic that could be used to analyze portions of the encrypted transmission.

Although FIGS. 2-3 illustrate a transmission fingerprint that represents an amount of data transmitted per unit of time, transmission fingerprints can be constructed from additional characteristics of the transmission such as packet size, timing of packet transmission or cadence, and overall size of the transmission. An eavesdropper can use these characteristics, separately or in combination, to create a fingerprint or to make inferences regarding characteristics of the encrypted transmission.

In various embodiments, the transmission fingerprint is obscured by reducing or eliminating patterns within the transmission. In some implementations, this is accomplished by randomizing various aspects of the transmission such as packet size, packet timing, or total transmission length. In other implementations, patterns that reveal information are concealed by making different types of transmission appear the same. For example, different transmissions can be changed so that they have the same packet size, packet timing, and total length.

Figure 4:
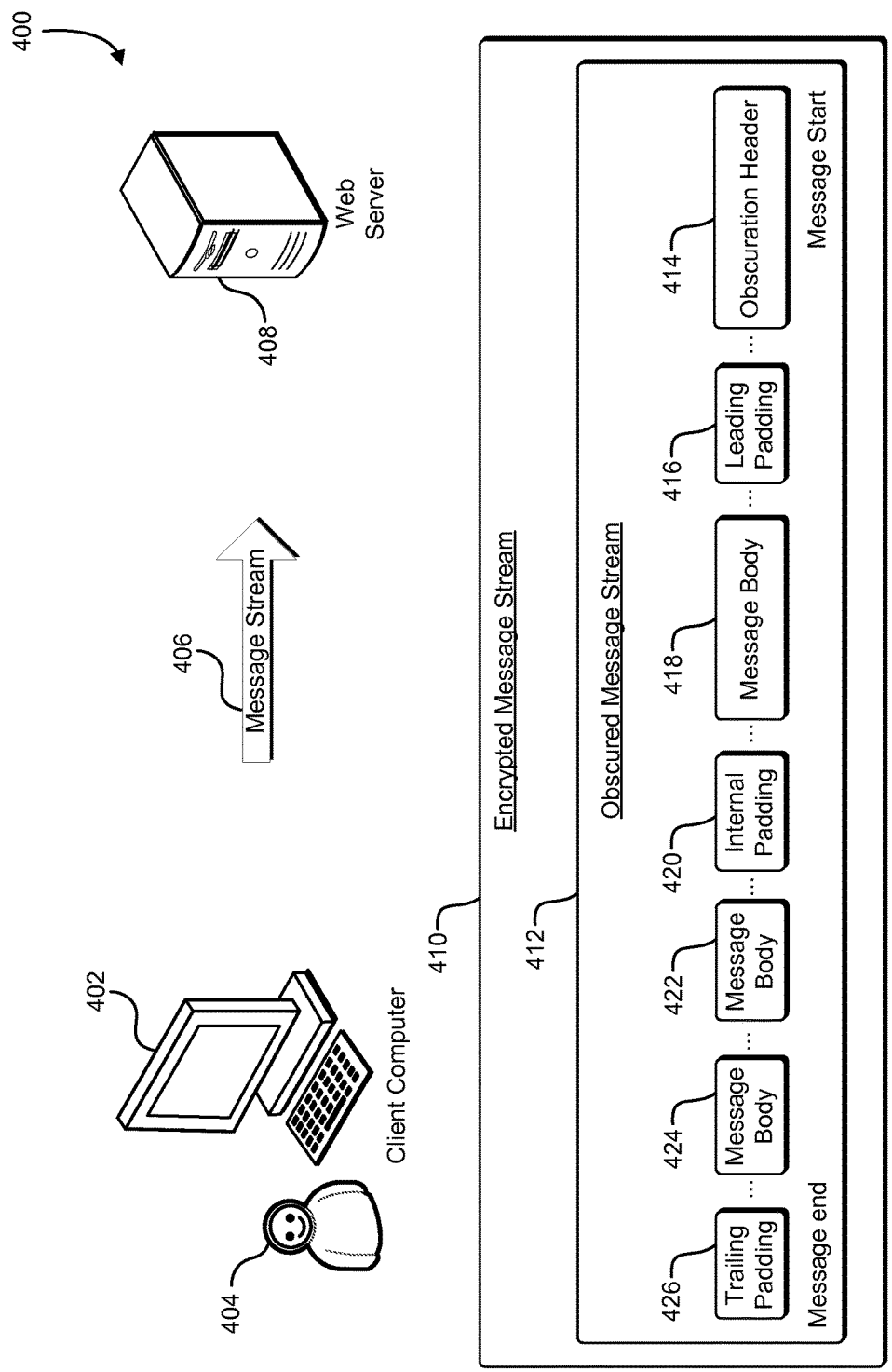
FIG. 4 shows an illustrative example of a client computer sending an obscured message to a web server, in accordance with an embodiment.

FIG. 4 shows an illustrative example of a client computer sending an obscured message to a web server, in accordance with an embodiment. A system diagram 400 includes a client computer 402 operated by a user 404. The user 404 operates the client computer 402 to send a message stream 406 to a Web server 408.

The structure of the message stream 406 is depicted as an encrypted message stream 410. In some implementations, the encrypted message stream 410 is an SSL/TLS transmission. In another implementation, the encrypted message stream 410 is an SSH transmission. In yet another implementation, the encrypted message stream 410 is encrypted using message stream encryption ("MSE"). An obscured message stream 412, generated by an obscuring engine, is transmitted using the encrypted message stream 410. The obscured message stream 412 starts with an obscuration header 414. The obscuration header 414 includes information used by a receiving obscuring engine to unobscure an incoming obscured message stream. For example, in one implementation, the obscuration header 414 includes information that describes where cryptographic keys are located and how a string of packets was originally partitioned. Next, the obscured message stream 412 includes a packet of leading padding 416. The packet of leading padding 416 can be of various lengths, making it more difficult for an eavesdropper to determine where a message begins. The obscured message stream 412 includes a number of message-body packets 418, 422, and 424, interspersed with internal-padding packets 420. A trailing-padding packet 426 is at the end of the obscured message stream 412.

The size and position of padding packets, the ordering and partitioning of message-body packets, and the cadence of packet transmission can be altered so that patterns associated with the transmission are obscured. By changing these and other aspects of the message transmission, a message fingerprint generated by an attacker is also usually changed, making the underlying transmission more difficult to characterize. When the aspects of two similar messages are changed in different ways, it becomes more difficult for an attacker to determine that the unobscured messages are similar. In some implementations padding-data packets are interspersed in the message, and the ordering and partitioning of message-body packets are changed. In a particular implementation, the number and position of padding-data packets and the ordering and partitioning of message-body packets are adjusted so that the distribution of packet sizes in the message stream appears random. In yet another implementation, the number of padding-data packets and the ordering and partitioning of message-body packets are adjusted so that the packets that the overall size and packet distribution of many different messages appears similar. For example, a number of different message streams can be obscured so that each message appears to have the same transmission fingerprint. Alternatively, message streams can be obscured so that each message has a different transmission fingerprint, even when a particular message is repeated.

Figure 5:
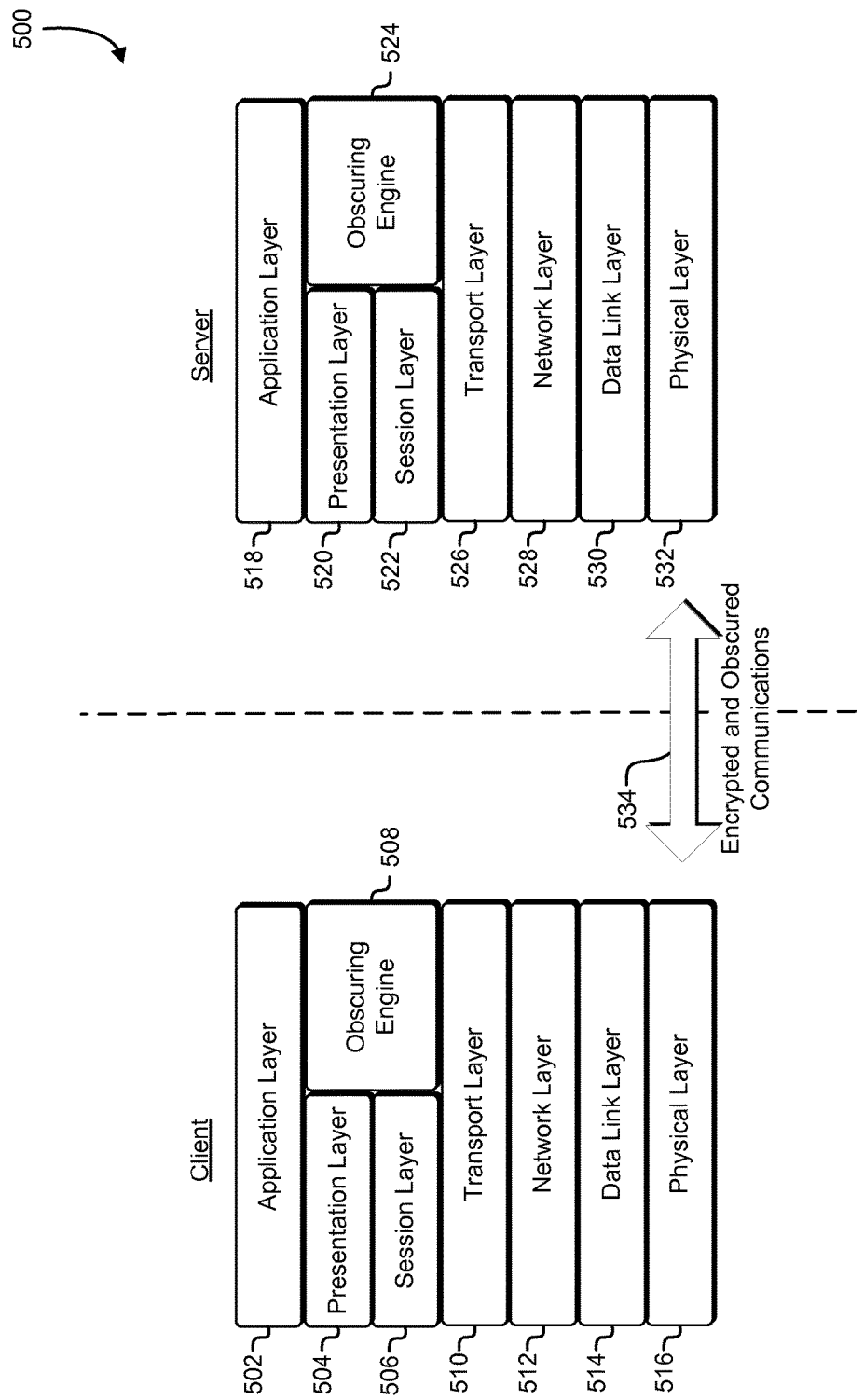
FIG. 5 shows an illustrative example of an obscuring engine in the context of a networking stack, in accordance with an embodiment.

FIG. 5 shows an illustrative example of an obscuring engine in the context of a networking stack, in accordance with an embodiment. A network model diagram 500 shows a client network stack and a server network stack using terminology from the OSI model (ISO/IEC 7498-1). The client network stack includes an application layer 502, a presentation layer 504, a session layer 506, an obscuring engine 508 that operates at the session and presentation layers, a transport layer 510, a network layer 512, a data link layer 514, and a physical layer 516. The server network stack includes an application layer 518, a presentation layer 520, a session layer 522, an obscuring engine 524 that operates at the session and presentation layers, a transport layer 526, a network layer 528, a data link layer 530, and a physical layer 532. Encrypted and obscured communications 534 are exchanged between the client and the server at the physical layer.

In the implementation shown, the obscuring engines are software modules that operate at the presentation and session layers in coordination with secure protocols such as SSL/TLS or SSH. The application layer above the obscuring engine provides plain text communications to the secure protocols in the presentation and session layers. The obscuring engine alters the fingerprint of a secure transmission by altering the packets that make up the transmission, or in some cases, altering the records within the secure transmission. In addition to obscuring the characteristics of the encrypted communications, when necessary, the obscuring engine unobscures received transmissions before they are decrypted by the secure protocols.

In some embodiments, the obscuring operations are transparent to the application layer. In such embodiments, obscuring operations are performed at the presentation, session or lower network layers. When the obscured transmissions are received by a recipient, the obscured transmissions are unobscured at the presentation, session or lower network layers, and the recipient application receives unobscured data. Applications need not be aware of the obscuring or un-obscuring operations performed by the obscuring engines.

In another implementation, the obscuring engines are software modules that are installed at the transport layers 510 and 526. In this configuration, the obscuring engines perform the obscuring operations on a sequence of encrypted packets that make up a secure transmission such as an IPSec transmission.

In yet another implementation the obscuring engines perform a variety of obscuring operations before and after the communications are encrypted. For example, parts of the obscuring engine may be installed above a session layer and operate on unencrypted transmissions, and additional parts of the obscuring engine may be installed below a session layer and operate on encrypted transmissions. In a particular example, an obscuring engine modifies the cadence of a transmission by altering the timing of packet transmission at the network layer, and reorders the packets that make up the transmission before they are encrypted at the session layer. In another example, secure SSL/TLS transmissions are passed into an obscuring engine and encrypted again by the obscuring engine to conceal header information added by the obscuring process.

Figure 6:
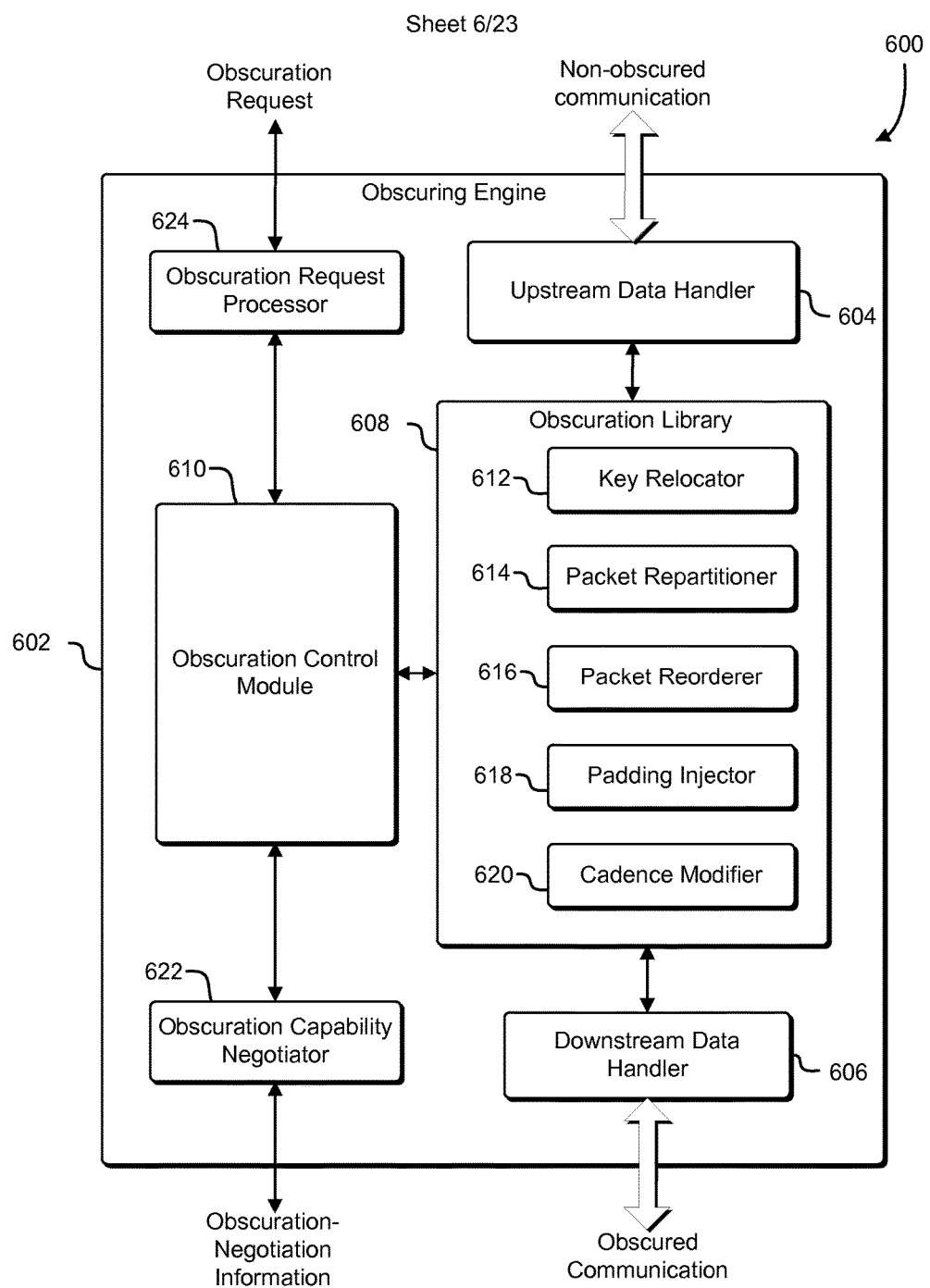
FIG. 6 shows an illustrative example of a block diagram of an obscuring engine, in accordance with an embodiment.

FIG. 6 shows an illustrative example of a block diagram of an obscuring engine, in accordance with an embodiment. A block diagram 600 illustrates a particular implementation of an obscuring engine 602, and the blocks within the obscuring engine represent various software modules that are part of the obscuring engine 602. The obscuring engine 602 includes an upstream data handler 604 and a downstream data handler 606. An obscuration library 608 is configured by an obscuration control module 610. The obscuration library 608 includes a number of modules that obscure a transmission: a key relocator 612; a packet repartitioner 614; a packet reorderer 616; a padding injector 618; and a cadence modifier 620. Various implementations of the obscuring engine 602 can include a subset of these obscuring modules or additional obscuring modules in addition to those listed above.

When an obscured message is received, an obscuration capability negotiator 622 receives obscuration-negotiation information regarding the obscuration capabilities and obscuration parameters used to obscure the message. The information is sent to the obscuration control module 610, and is used to configure the various modules contained within the obscuration library 608 to unobscure the received message. The received obscured message is processed by the downstream data handler 606 and passed to the configured obscuration library 608. The configured obscuration library 608 unobscures the received obscured message and passes the unobscured message to the upstream data handler 604 which passes the message to a recipient. In some implementations, the recipient is a session-layer secure protocol that decrypts the received message.

When an obscured message is sent, an obscuration request processor 624 receives an obscuration request containing preferences relating to the message transmission. In some implementations the preferences include a ranking of obscuration capabilities. The preferences are sent to the obscuration control module 610, and are used along with information received by the obscuration capability negotiator 622 to configure the various modules contained within the obscuration library 608 to obscure the transmitted message. The non-obscured message is transmitted through the upstream data handler 604 and through the configured obscuration library 608. The obscured message is transmitted by the downstream data handler 606 to a recipient.

Figure 7:
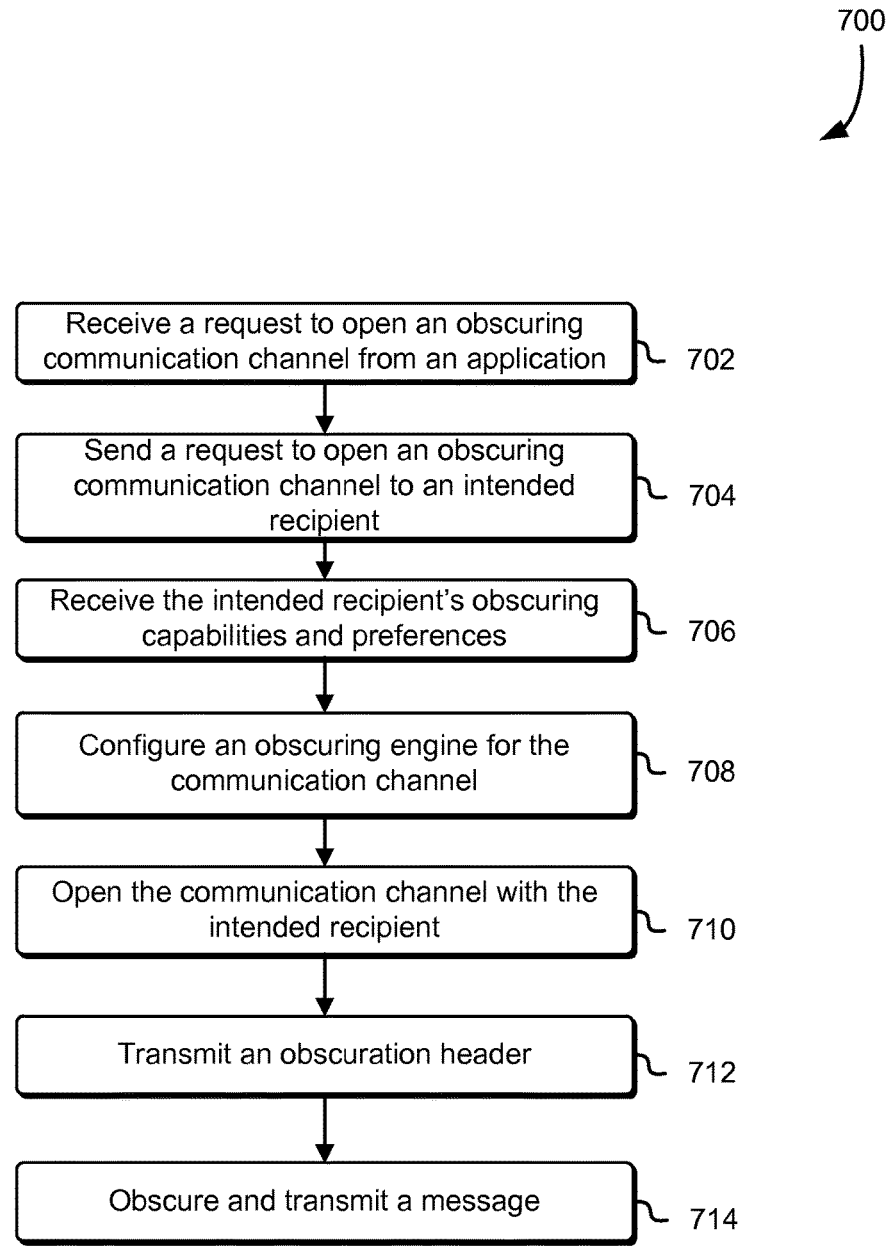
FIG. 7 shows an illustrative example of a process that, when performed by an obscuring engine, obscures a message and sends the obscured message to a recipient, in accordance with an embodiment.

FIG. 7 shows an illustrative example of a process that, when performed by an obscuring engine, obscures a message and sends the obscured message to a recipient, in accordance with an embodiment. A message-obscuring process 700 begins when an obscuring engine receives 702 a request from a sender to open an obscuring communication channel to a recipient. In some implementations, the request includes preferences relating to how the message should be obscured and transmitted. The obscuring engine sends 704 a request to the intended recipient to open an obscuring communication channel. In response, the recipient's obscuring engine returns information describing the recipient's obscuring engine's obscuring capabilities and obscuration parameters. The obscuring engine receives 706 the information describing the recipient's obscuring capabilities, and configures 708 the obscuring engine according to the preferences and capabilities of the sender and the receiver.

In some implementations, a negotiation takes place between the sender's obscuring engine and the recipient's obscuring engine. The capabilities of both obscuring engines are analyzed to determine the set of mutually-supported obscuring capabilities. A subset of the mutually supported obscuring abilities are determined based at least in part on the preferences of the sender, and used to configure the obscuring engine. In a particular implementation, the preferences include a ranking of available obscuration capabilities, and the selection of obscuring operations is based at least in part on the ranking provided by the sender.

In another implementation, the configuration of the obscuring engine is based at least in part on the mutually supported obscuring capabilities of both obscuring engines, and characteristics of the transmission determined by the obscuring engine. For example, when the obscuring engine detects that the transmission is using envelope-based encryption techniques, the obscuring engine configures a key relocation capability in the obscuring engine to ensure that encryption keys within the message are not located in predictable locations.

The configuration of the obscuring engine can, in certain implementations, be expressed as a set of transmission obscuration parameters and a set of data obscuration parameters, or, in other implementations simply as obscuration parameters. Data obscuration parameters control aspects of the obscuring engine that modify the data itself. For example, parameters associated with relocating a portion of the data, or adding padding to the data are data obscuration parameters. Transmission obscuration parameters control aspects of the obscuring engine that modify the way that data is transmitted. For example, parameters associated with changing the timing or ordering if packets in a data transmission are transmission obscuration parameters.

At block 710, the obscuring engine opens a communication channel with the intended recipient. In some implementations, the obscuring engine opens an encrypted communication channel with the intended recipient. In another implementation, the obscuring engine opens an unencrypted communication channel with the intended recipient, and encrypts portions of the obscured message before transmission over the unencrypted communication channel. At block 712, the obscuring engine transmits the obscuration header over the communication channel. In some implementations, when the communication channel is an unencrypted communication channel, the obscuration header is encrypted before the obscuration header is transmitted. At block 714, the body of the message is transmitted over the communication channel.

Figure 8:
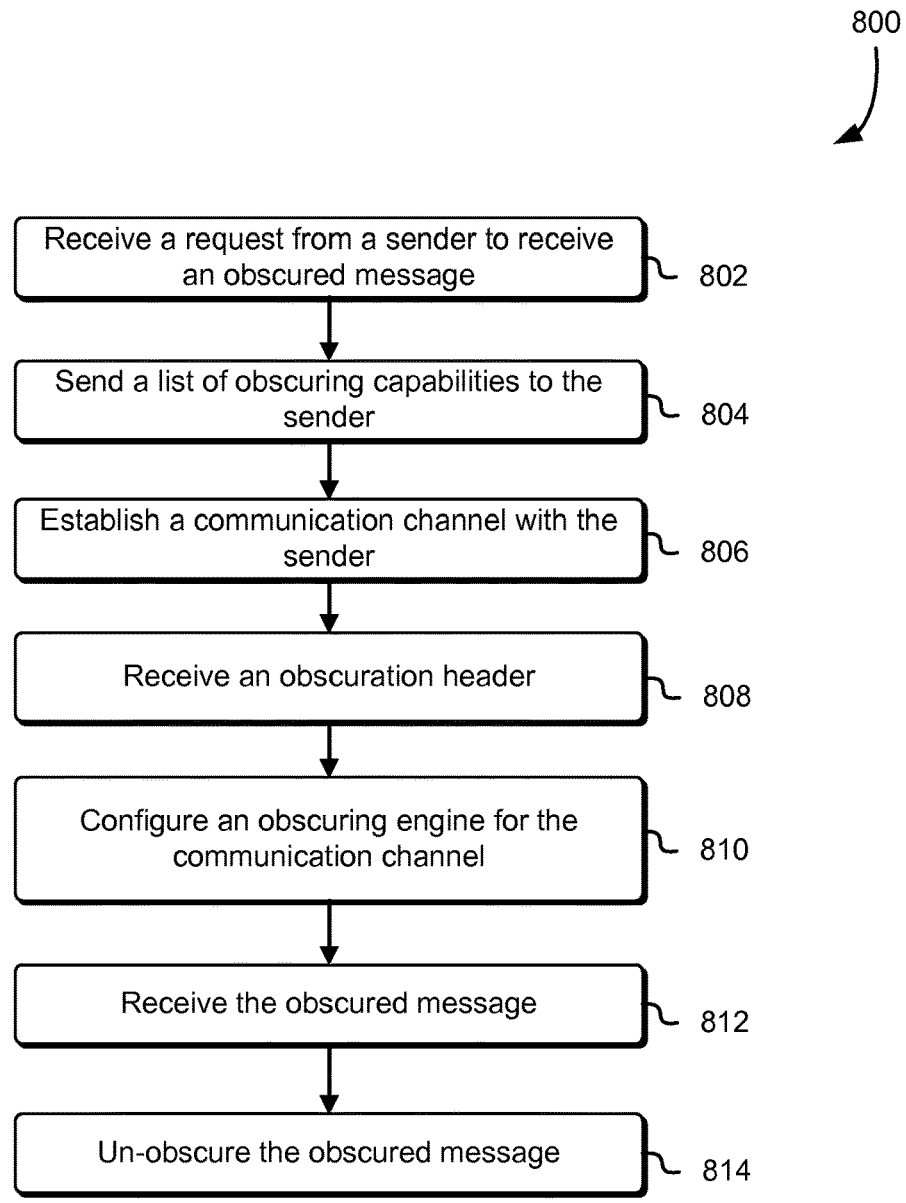
FIG. 8 shows an illustrative example of a process that, when performed by an obscuring engine, receives and un-obscures an obscured message from a sender, in accordance with an embodiment.

FIG. 8 shows an illustrative example of a process that, when performed by an obscuring engine, receives and unobscures an obscured message from a sender, in accordance with an embodiment. A transmission-unobscuring process 800, when performed by an obscuring engine, modifies a received message to reverse various obscuring operations performed by the sender. In some implementations, some obscuring operations performed by the sender are not reversed. For example, in some implementations, when the sender modifies the cadence of the transmission, the receiver does not restore the transmission to its original cadence. In another implementation, when the sender modifies the partitions of a packet-based transmission, the receiver does not restore the partitions when the message is unobscured. Whether a particular obscuring operation is reversed is determined, in various implementations, by the content and format of the message.

The transmission-unobscuring process 800 begins at block 802 where the obscuring engine receives a request from the sender to establish an obscured communication channel. As a result, the obscuring engine sends 804 a list of supported obscuring capabilities to the sender. In various implementations, the sender uses the list of supported obscuring capabilities, and additional information, to determine a set of obscuring operations that will be performed before the message is transmitted. At block 806, a communication channel is established with the sender. In some implementations, the communication channel is initiated by the sender and the receiver accepts the connection request. An obscuration header is received 808 that contains information related to the set of obscuring operations used to obscure the message. The information contained in the obscuration header is used at least in part to configure 810 the obscuring engine to reverse various obscuring operations performed by the sender. In some implementations, the obscuring engine reverses all obscuring operations performed by the sender. In another implementation, the obscuring engine does not reverse obscuring operations that do not adversely affect the data integrity of the message. In yet another implementation, the configuration of the obscuring engine is communication-channel specific. For example, messages received via a particular communication channel are processed by the obscuring engine using a particular obscuring-engine configuration, while messages received via another communication channel are processed by the obscuring engine using a different obscuring-engine configuration.

At block 812, the obscuring engine receives the obscured message from the sender. The obscuring engine unobscures 814 the message and passes the unobscured message up the network stack to a receiving application or higher network layer.

FIGS. 9-22 illustrate various obscuring capabilities by showing the alterations made to a data transmission, and illustrative processes that can be used to perform and reverse the obscuring alterations. The obscuring engine described above and throughout the current document can be used with some or all of these obscuring capabilities, but this should not be considered limiting. In various implementations, additional obscuring capabilities can be added to the obscuring engine and existing obscuring capabilities can be modified in response to new forms of eavesdropping-attacks.

One obscuring capability is key relocation. Certain encryption formats, such as envelope-based encryption, encrypt a message body with a data encryption key (DEK), and then place the encrypted DEK at the beginning of the message. Although the encrypted DEK is itself encrypted with a key encrypting key (KEK), the encrypted DEK is vulnerable to a cryptographic attack because an attacker knows that the encrypted DEK is located at the beginning of the message, and can focus the attack on decrypting the encrypted DEK. Key relocation identifies cryptographic keys or additional critical information, and relocates the cryptographic keys or additional critical information to other locations within the message. For example, when a secure protocol places and encrypted cryptographic key at the beginning of a message envelope, an obscuring engine applying a key-relocation obscuring capability relocates the encrypted cryptographic key to another location in the message. An eavesdropper that intercepts the message would generally assume that the encrypted cryptographic key is in its normal location, making a cryptographic attack less likely to succeed.

Figure 9:
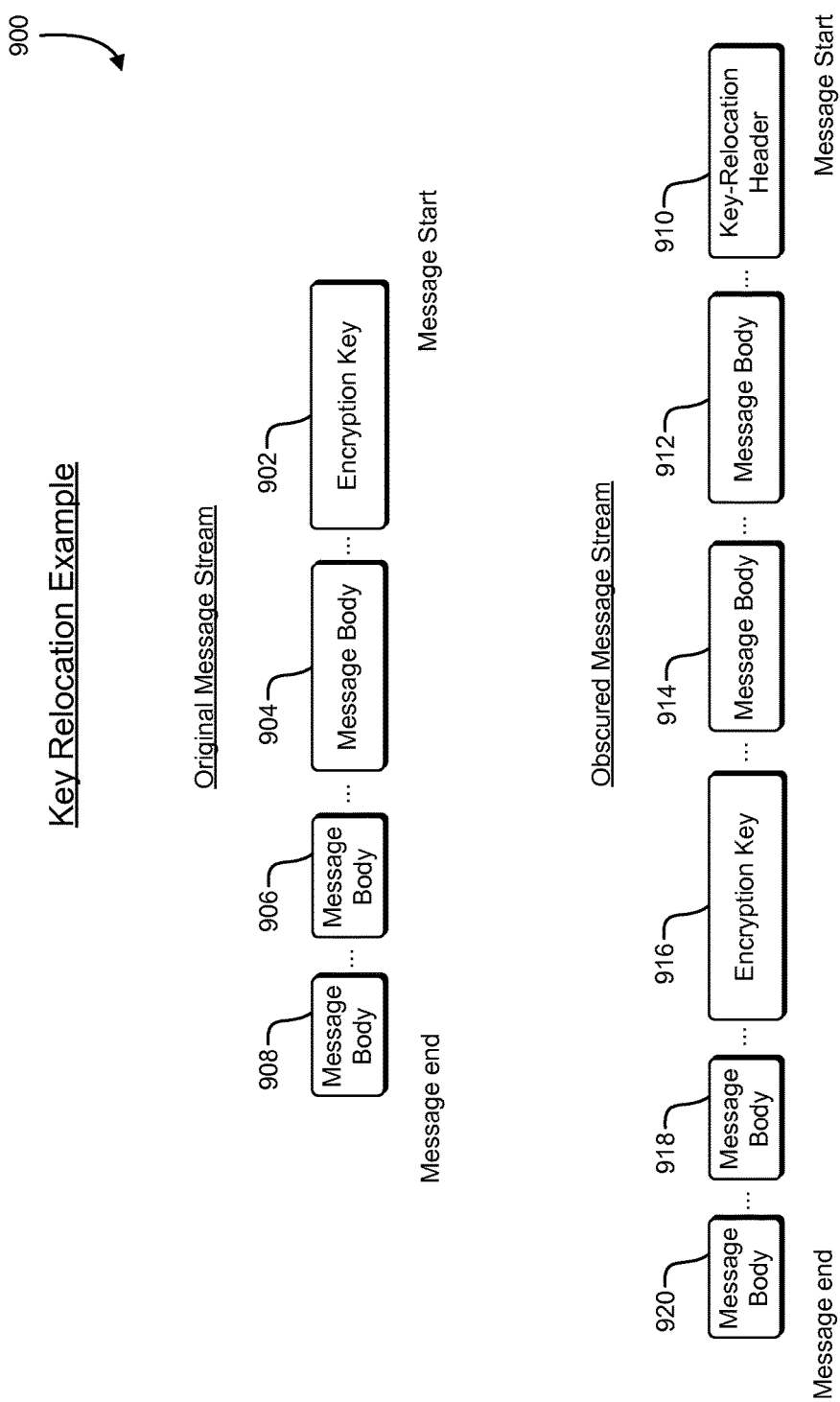
FIG. 9 shows an illustrative example of a message stream and a corresponding obscured message stream that has been obscured using a key relocation process, in accordance with an embodiment.

FIG. 9 shows an illustrative example of a message stream and a corresponding obscured message stream that has been obscured using a key relocation process, in accordance with an embodiment. Diagram 900 shows an original message stream that starts with an encryption key 902. A number of message-body packets 904, 906, and 908 follow the encryption key 902.

In many environments, the encryption key 902 is in a widely known location determined by a secure protocol standard. For example, envelope-based encryption schemes utilize a data encryption key to encrypt a message body. The data encryption key (DEK) is encrypted with a key encrypting key (KEK), and placed at the beginning of the message. Although the DEK is encrypted, an attacker often knows the format of the envelope-based encryption scheme and can focus a cryptographic attack on the beginning of the message, thereby reducing the amount of effort required to achieve a successful attack. By relocating the DEK to a different location, it is more difficult for an attacker to attack the message.

Once the encryption key has been relocated, a resulting obscured message stream starts with a key-relocation header 910. In some implementations, the key-relocation header contains a tag that identifies the location of a relocated DEK 916 within a number of obscured-message-body packets 912, 914, 918, and 920. In another implementation, the key-relocation header 910 contains a numerical offset that describes the location of the relocated DEK 916 within the obscured-message-body packets 912, 914, 918, and 920. In yet another implementation, the key-relocation header 910 is encrypted using a cryptographic key. In some implementations, the cryptographic key used to encrypt the key-relocation header 910 is a public key or a shared secret key or other cryptographic key derived from a shared secret (e.g., using a key derivation function such as PBKDF2). In another implementation, the key-relocation header 910 is encrypted with the same key used to encrypt the DEK 916.

Figure 10:
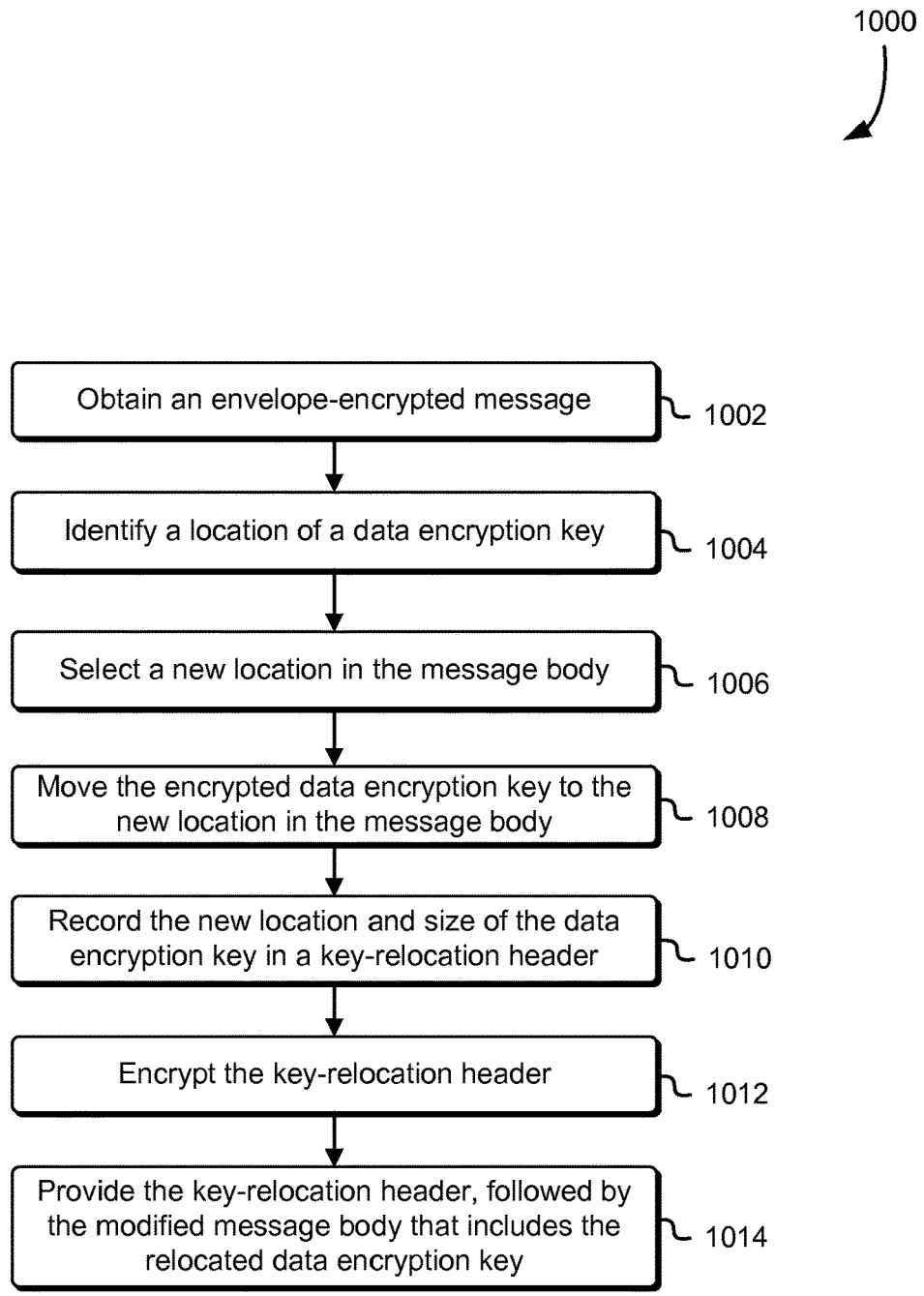
FIG. 10 shows an illustrative example of a process that, when performed by an obscuring engine, obscures a message using a key relocation process, in accordance with an embodiment.

FIG. 10 shows an illustrative example of a process that, when performed by an obscuring engine, obscures a message using a key-relocation process, in accordance with an embodiment. A process diagram 1000 begins at block 1002 when an obscuring engine obtains an envelope-encrypted message. The obscuring engine identifies 1004 the location of a data encryption key within the envelope-encrypted message. In some implementations, the location of the data encryption key is determined by identifying the particular envelope-encrypted message protocol used by the message. At block 1006, a location within the message is selected that will be the new location for the data encryption key. In certain implementations, a random location is selected. In another implementation, a location is chosen within the first 100 kb of the envelope encrypted data. The data encryption key is moved 1008 to the selected location within the message. At block 1010 key-relocation information is recorded in a key-relocation header. In certain implementations, the key-relocation information includes the original location of the data encryption key, the new location of the data encryption key, and the size of the data encryption key. In another implementation, the key-relocation header includes the new location of the data encryption key, and the size and original location of the encryption key are inferred from the format of the envelope-based encrypted message. The key-relocation header is cryptographically secured 1012 using a shared secret or public key. The key-relocation header, followed by the modified message body that includes the relocated data encryption key, are provided 1014 by the obscuring engine. In some situations, the resulting obscured message stream is less vulnerable to a cryptographic attack.

Figure 11:
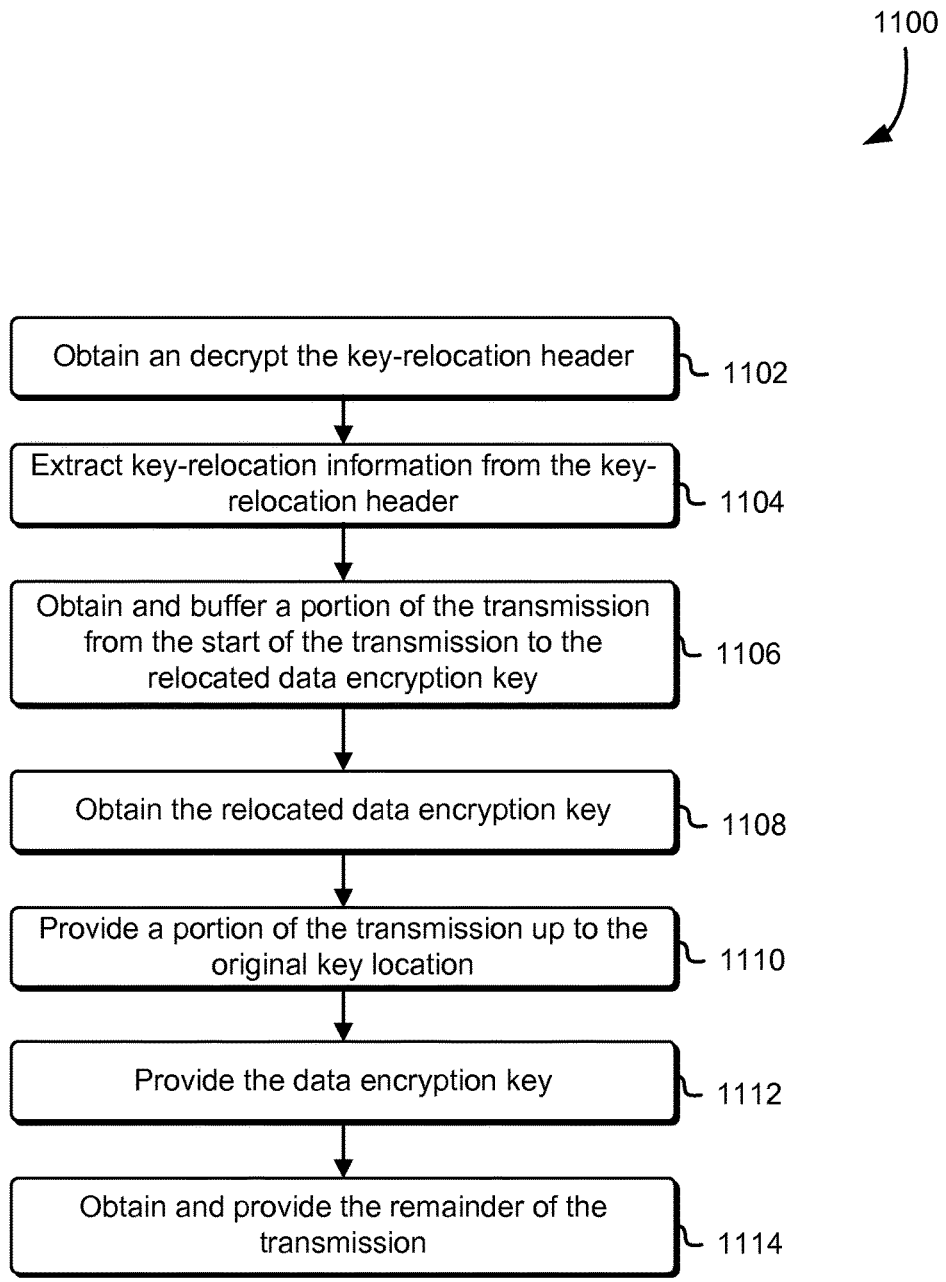
FIG. 11 shows an illustrative example of a process that, when performed by an obscuring engine, un-obscures a message that has been obscured using a key-relocation process, in accordance with an embodiment.

FIG. 11 shows an illustrative example of a process that, when performed by an obscuring engine, unobscures a message that has been obscured using a key-relocation process, in accordance with an embodiment. Process 1100 begins at block 1102 when an obscuring engine obtains a transmission that begins with a key-relocation header. The obscuring engine decrypts the key-relocation header, and extracts 1104 key-relocation information from the key-relocation header. At block 1106, the obscuring engine obtains and stores a portion of the transmission in a buffer, the portion being from the beginning of the transmission to the location of the relocated key. Next, the obscuring engine obtains 1108 the relocated key. At block 1110, the obscuring engine begins providing the unobscured transmission by providing a portion of the transmission from the beginning of the transmission to the original key location. In some implementations, the original key location is at the start of the transmission so no part of the transmission is provided. In another implementation, the original key location is within the portion of the transmission that is stored, and a portion of the stored transmission is provided. In yet another implementation, the original key location is further into the transmission, and the obscuring engine provides the stored portion of the transmission and obtains and provides an additional portion of the transmission up to the original key location. Once the portion of the portion of the transmission up to the original key location has been provided, the obscuring engine provides 1112 the relocated key. At block 1114, the obscuring engine provides the remainder of the transmission. In some implementations, the remainder of the transmission is provided by obtaining and providing the remainder of the transmission. In another implementation, the remainder of the message is provided by providing remaining stored portions of the transmission, and then obtaining and providing the remainder of the transmission.

When obscuring the characteristics of a transmission using key relocation, the key can be relocated to various new locations within the transmission. The new location of the key can, in some implementations, affect performance of the underlying application. For example, for streaming video, the new location of the key should be toward the front of the transmission so that playback delay and buffering requirements are kept at reasonable levels. In another example, for transmissions that are consumed as a single unit such as program files, the key can be relocated to any position in the transmission. In some implementations where a received transmission is stored in a buffer until the relocated key is received, the new location of the key should be within the buffering capability of the intended recipients.

Another obscuring capability is packet repartitioning. In certain packet-based network environments, data is transmitted over a network using discrete data packets. Data streams are divided into a number of discrete packets, the packets are transmitted over the packet-based network, and then reassembled into a data stream by the recipient. In some situations, an attacker can analyze how a data stream is divided into packets and infer information about the data contained in the transmission. Packet repartitioning changes the way a data stream is divided into packets by, in some implementations, combining multiple packets into a single packet, or by dividing a single packet and multiple packets. In this way, data streams are partitioned into packets in less predictable ways and packet-partition information is less useful to an attacker.

Figure 12:
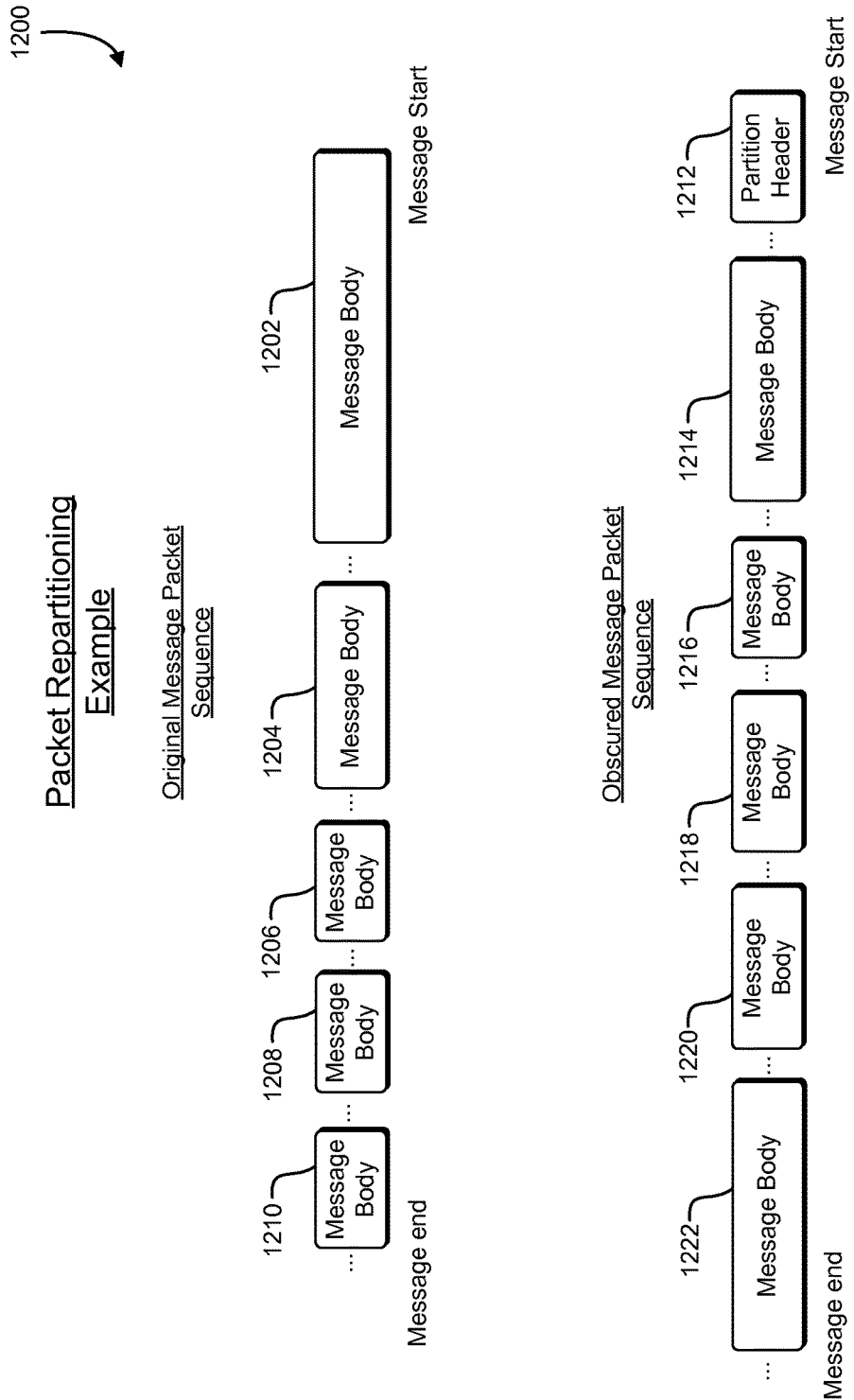
FIG. 12 shows an illustrative example of a message stream and a corresponding obscured message stream that has been obscured using a packet-repartitioning process, in accordance with an embodiment.

FIG. 12 shows an illustrative example of a message stream and a corresponding obscured message stream that has been obscured using a packet-repartitioning process, in accordance with an embodiment. Diagram 1200 shows an original message packet sequence comprised of a number of original message packets 1202, 1204, 1206, 1208, and 1210. The width of each message-body packet represents the amount of data contained in each message-body packet. For example, the message-body packet 1202 contains more data than the message-body packet 1206. An obscured message packet sequence begins with a partition header 1212. The partition header 1212 includes information relating to the size and spacing of the original message packets. An obscured message packet sequence follows the partition header 1212, and is comprised of a number of repartitioned message packets 1214, 1216, 1218, 1220, and 1222.

The data represented by the number of repartitioned message packets is identical, in the aggregate, to the data represented by the number of original message packets. A repartitioning operation can be achieved in a variety of ways. In some implementations, the original message packets are merged into a single stream of data, which is then divided into a number of repartitioned message packets. In another implementation, some original message packets are divided into two or more repartitioned message packets, and some original message packets are combined into a single repartitioned message packet. In yet another implementation, the partitions between each repartitioned message packet are arranged so that the size of each repartitioned message packet is the same. In yet another implementation, the partitions between each repartitioned message packet are arranged so that the size of each repartitioned message packet is random.

In some implementations, the partition header 1212 is omitted when the particular partition structure of the message packet sequence does not impact the substance of the message. For example, if a received packet sequence is combined by higher network layers into a single stream and consumed by an application, the original partitioning of the individual packets that make up the stream is irrelevant. Therefore, in these situations, the partition header 1212 is omitted, and when a repartitioned message packet sequence is received by the obscuring engine, the repartitioned message packet sequence is sent to the recipient without restoring the original partitioning.

Figure 13:
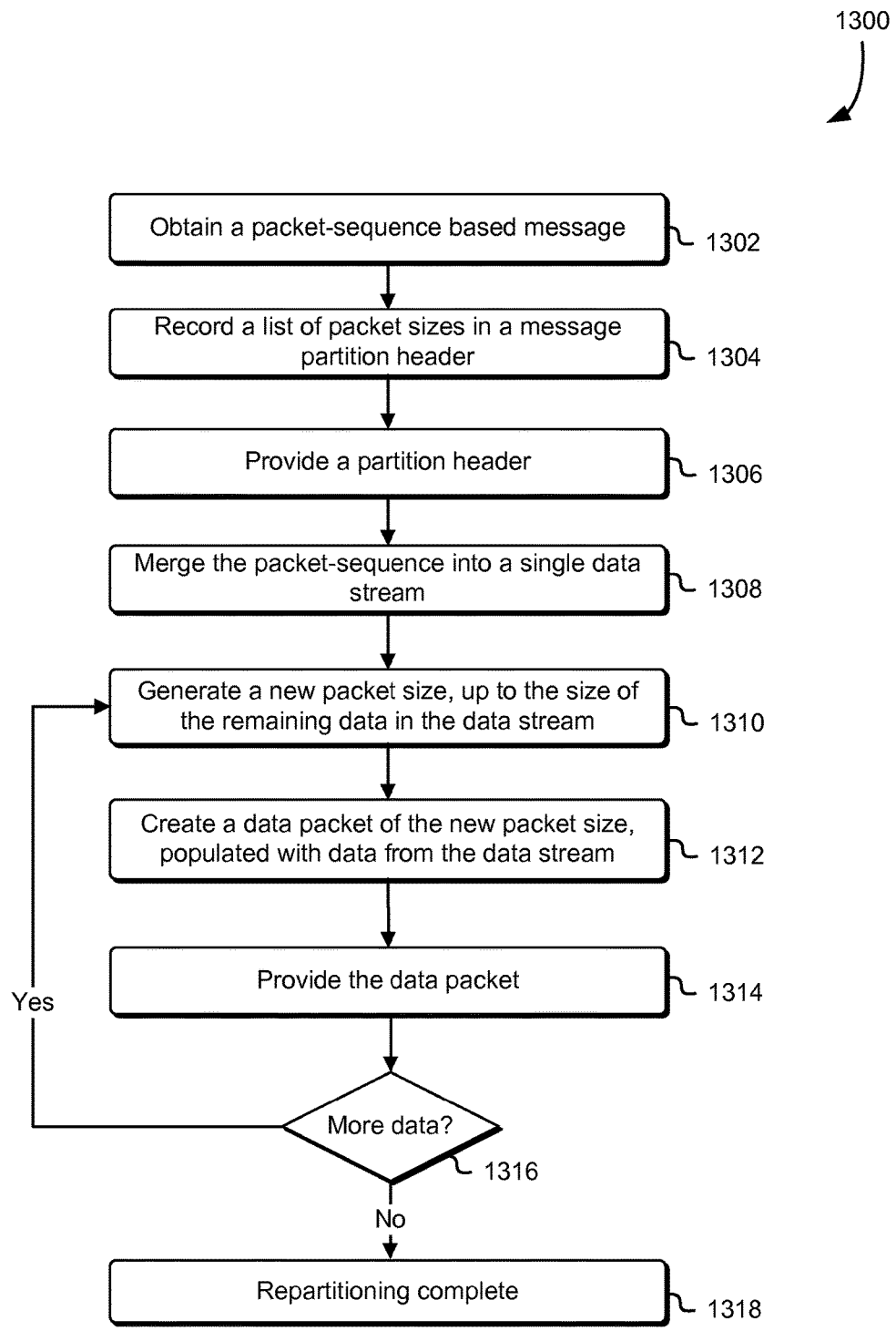
FIG. 13 shows an illustrative example of a process that, when performed by an obscuring engine, obscures a message using a packet-repartitioning process, in accordance with an embodiment.

FIG. 13 shows an illustrative example of a process that, when performed by an obscuring engine, obscures a message using a packet-repartitioning process, in accordance with an embodiment. A process diagram 1300 begins at block 1302 where an obscuring engine obtains a packet-sequence-based message. The obscuring engine records 1304 information describing the partitioning of a packet sequence that makes up the packet-sequence-based message. In one implementation, the obscuring engine records the size of each packet in the packet sequence. In another implementation, the obscuring engine records the location of each partition between packets. At block 1306, the obscuring engine provides a partition header that includes information that describes the structure of the packet sequence. In some implementations, when the original partitioning of the packet sequence is not restored by the recipient, block 1306 is omitted. At block 1308, the obscuring engine combines the packets in the packet sequence into a single data stream. In some implementations, the obscuring engine combines a portion of the packets in the packet sequence into a single data stream to accommodate a limited input buffer size.

The obscuring engine processes the single data stream by generating 1310 a new packet size, creating 1312 a new data packet having a size of the new packet size, and populating the new data packet by extracting data from the single data stream. At block 1314, the obscuring engine provides the new data packet. If the obscuring engine determines 1316 that the single data stream contains more data, execution of the process returns to block 1310 where another new packet size and new packet are generated. When the obscuring engine determines that the single data stream is empty, execution proceeds to block 1318 and the repartitioning operation is complete.

In some implementations, the new packet size is a constant. In another implementation the new packet size is determined based at least in part on the acceptable range of packet sizes defined by an underlying network transmission protocol. The new packet size can be generated using a pseudorandom number generator such as a cyclic redundancy code or other random number generator, and manipulated to fall within the range of acceptable packet sizes defined by the underlying network protocol. For example, for a packet-based protocol with a packet size of 0 to 2 k, the new packet size can be determined by 1024+(rand(1024)) where rand(1024) returns a pseudorandom number between 0 and 1024.

Figure 14:
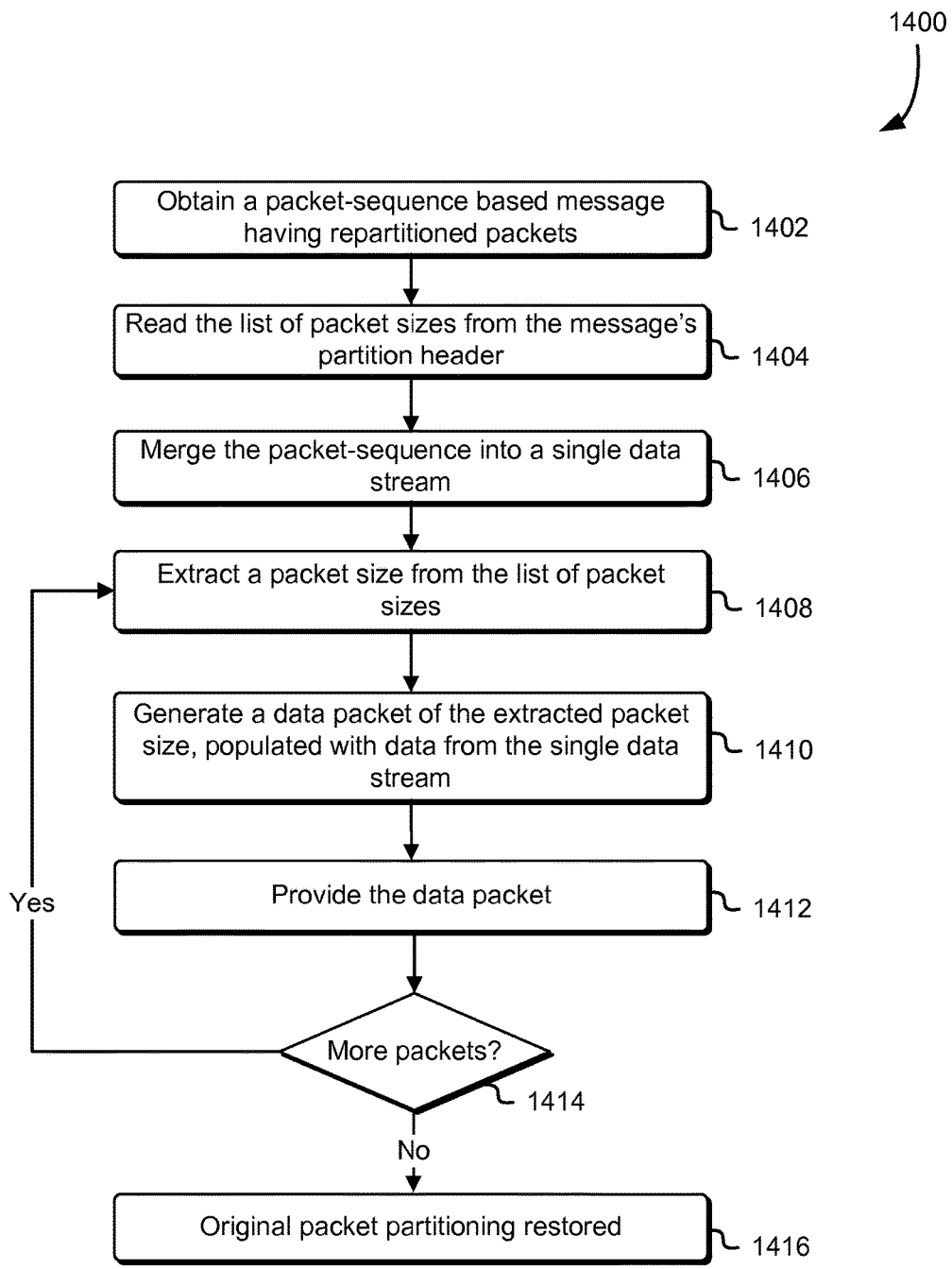
FIG. 14 shows an illustrative example of a process that, when performed by an obscuring engine, un-obscures a message that has been obscured using a packet-repartitioning process, in accordance with an embodiment.

FIG. 14 shows an illustrative example of a process that, when performed by an obscuring engine, unobscures a message that has been obscured using a packet-repartitioning process, in accordance with an embodiment. A process diagram 1400 begins at block 1402 where an obscuring engine receives a partition header as the first portion of a packet-sequence-based message. The obscuring engine reads 1404 information from the partition header that describes the original partition structure of the packet-sequence-based message. At block 1406, the obscuring engine reads the entire packet-sequence-based message into memory and merges the associated packet sequence into a single data stream.

The obscuring engine restores the original partitioning of the packet-sequence-based message by extracting 1408 an original packet size from the petition header information, generating 1410 a new data packet with the original packet size, and populating the new data packet with data extracted from the single data stream. At block 1412, the obscuring engine provides the new data packet. When the obscuring engine determines that more packets were in the original packet-sequence-based message, execution returns to block 1408 where additional new packets are created. When the obscuring engine determines that no more packets were in the original packet-sequence-based message, execution proceeds to block 1416 and the original packet partitioning is restored.

In some implementations, the original packet partitioning is not restored. When the original packet partitioning is not restored, the receiving obscuring engine discards the message's partition header and outputs the remaining message packets in the form they are received.

Another obscuring capability is packet reordering. In certain packet-based network environments, the ordering of particular packets can reveal information that is useful to an attacker. In some implementations, an obscuring engine performs a packet-reordering operation that tags a packet sequence with an original ordering, and transmits the packet sequence in a variable order. When the reordered packet sequence is received a receiving obscuring engine uses the tags to restore the original packet order. Packet reordering makes fingerprint analysis techniques that rely on a particular sequence of packets less effective.

Figure 15:
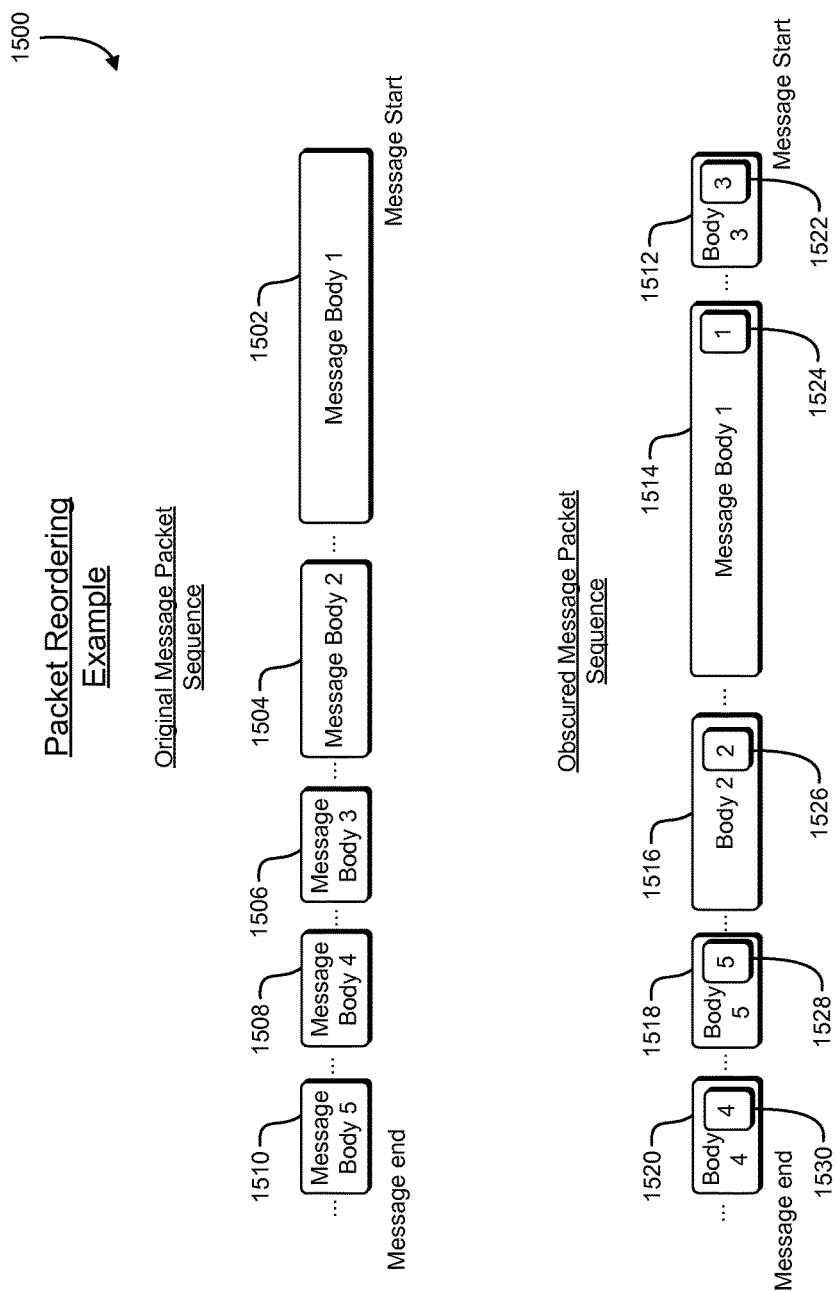
FIG. 15 shows an illustrative example of a message stream and a corresponding obscured message stream that has been obscured using a packet-reordering process, in accordance with an embodiment.

FIG. 15 shows an illustrative example of a message stream and a corresponding obscured message stream that has been obscured using a packet-reordering process, in accordance with an embodiment. Diagram 1500 shows an original message packet sequence comprised of an ordered sequence of message-body packets 1502, 1504, 1506, 1508, and 1510. An obscured message packet sequence is comprised of an ordered sequence of reordered-message-body packets 1512, 1514, 1516, 1518, and 1520. Each reordered-message-body packet includes a packet-order tag 1522, 1524, 1526, 1528, and 1530. The packet-order tags preserve information relating to the original ordering of the original packet sequence. In some implementations, the obscured message packet sequence includes a packet-reordering header that saves information relating to the original ordering of the packet sequence.

In some implementations, such as when reordering SSL/TLS transmissions, the obscuring engine adds record indexes in each encrypted record. The record indexes are used to sort the records after decryption, and are discarded before the records are passed to an application layer.

In additional implementations, where the order of the original packet sequence is not critical to the content of the message, the packet ordering of the obscured message packet sequence is not restored when the message is received. For example, some packet-based application level protocols, such as some electronic messaging applications, are unconcerned with the ordering of packets received. In such implementations, the obscured message packet sequence does not contain a packet-reordering header nor do the reordered-message-body packets include packet-order tags.

Figure 16:
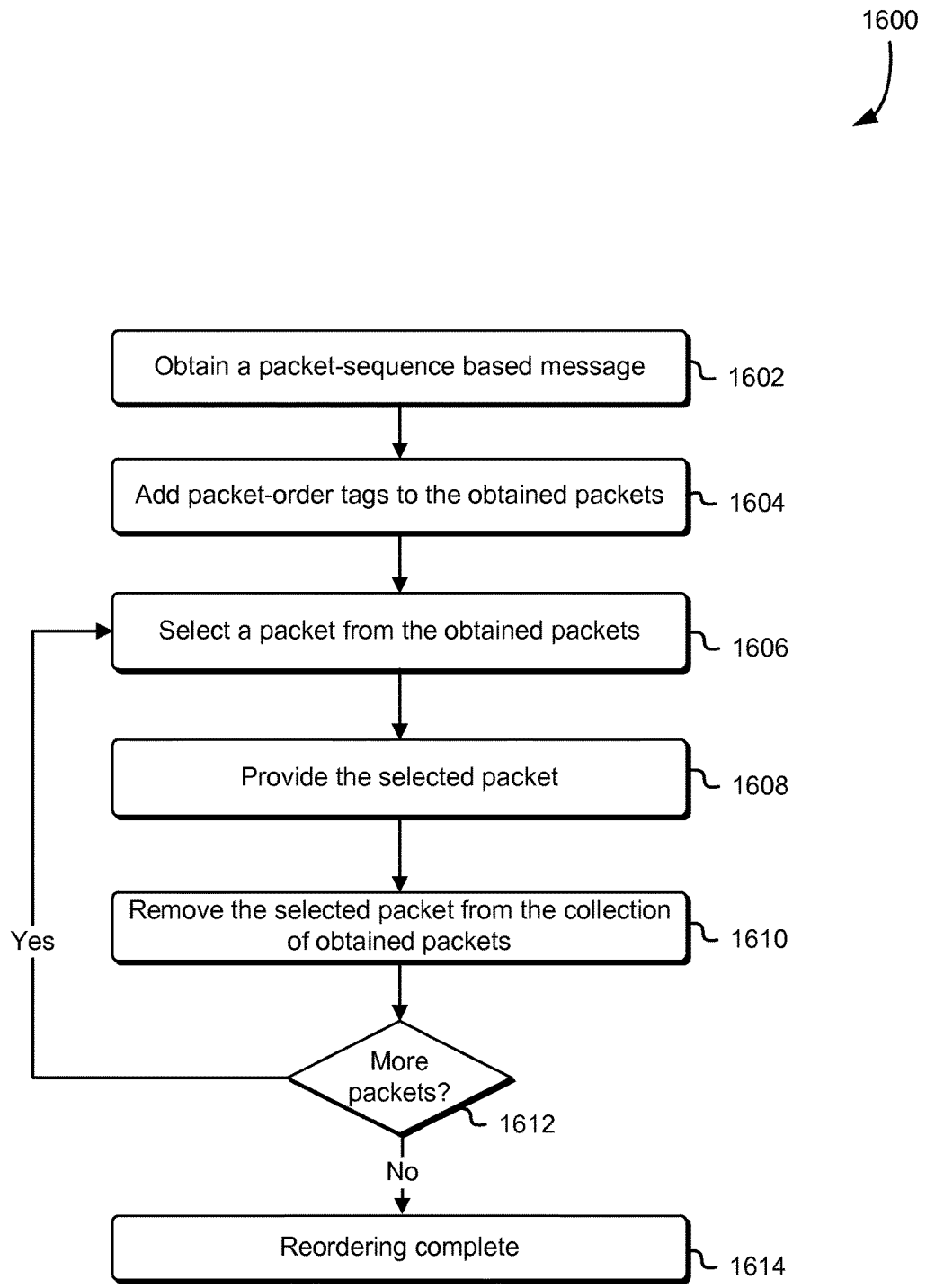
FIG. 16 shows an illustrative example of a process that, when performed by an obscuring engine, obscures a message using a packet-reordering process, in accordance with an embodiment.

FIG. 16 shows an illustrative example of a process that, when performed by an obscuring engine, obscures a message using a packet-reordering process, in accordance with an embodiment. A process diagram 1600 begins at block 1602 where an obscuring engine obtains a packet-sequence-based message. At block 1604, the obscuring engine adds packet-order tags to message packets that make up the packet-sequence-based message. The packet-order tags record the original ordering of the message packets.

The obscuring engine selects 1606 a packet from the message packets that make up the packet-sequence-based message, and provides 1608 the selected packet. The packet can be selected using a random or pseudorandom sequence. For example, in one implementation a cyclic redundancy code ("CRC") is generated and the code is used to select a packet from the message packets that make up the packet-sequence-based message. Once the selected packet has been output, the selected packet is removed 1610 from the message packets that make up the packet-sequence-based message. As long as the obscuring engine determines 1612 that there are packets remaining in the set of message packets that make up the packet-sequence-based message, execution returns to block 1606 where additional packets are selected and output. When no packets remain, execution proceeds to block 1614 and the reordering of the packet sequence is complete.

Figure 17:
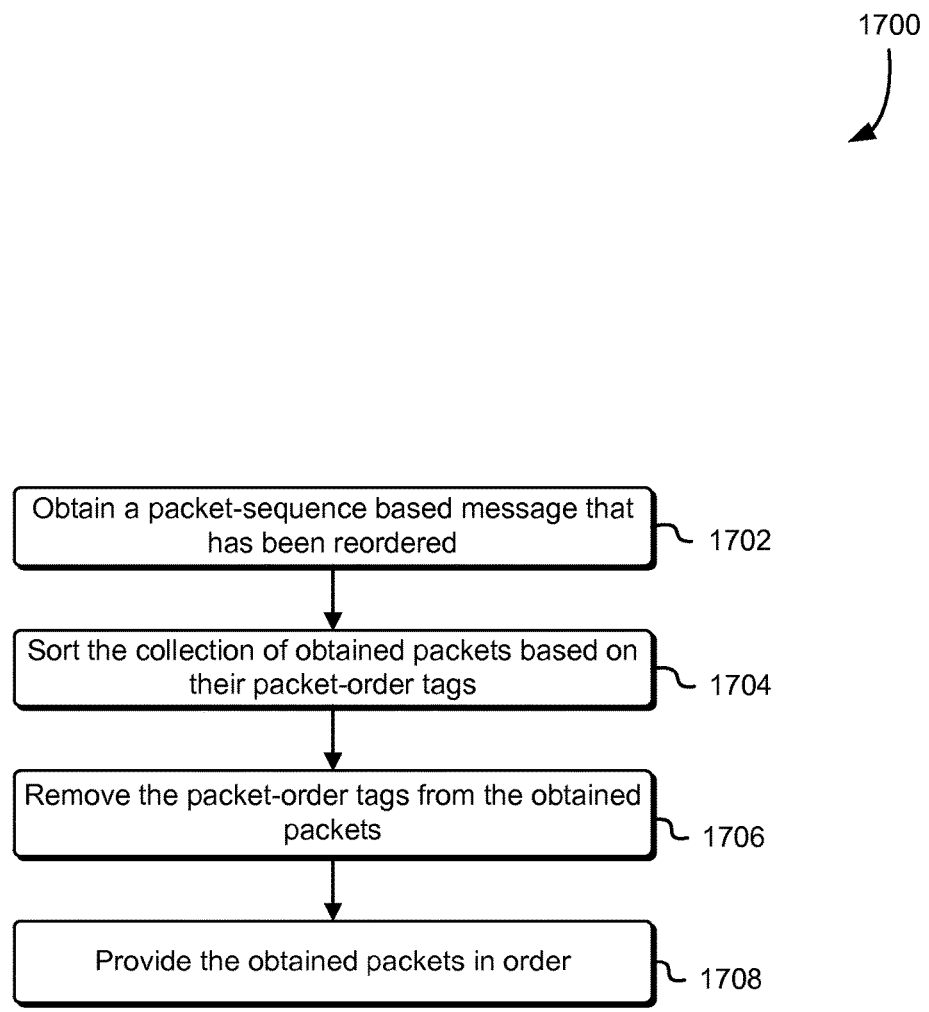
FIG. 17 shows an illustrative example of a process that, when performed by an obscuring engine, un-obscures a message that has been obscured using a packet-reordering process, in accordance with an embodiment.

FIG. 17 shows an illustrative example of a process that, when performed by an obscuring engine, unobscures a message that has been obscured using a packet-reordering process, in accordance with an embodiment. A process 1700 begins at block 1702 where an obscuring engine receives a reordered packet-sequence-based message. The packet-sequence-based message is input into a buffer and stored as a collection of input packets. The obscuring engine sorts 1704 the collection of input packets based at least in part on packet-order tags attached to the packets. Once the collection of input packets has been sorted, the packet-order tags are removed 1706 from the collection of input packets. At block 1708 the collection of input packets is output in order, and the process is complete.

Stream-based messages that contain internal record structure can be obscured by reordering the records within the stream-based message. For example, an SSL/TLS transmission that includes a sequence of records can be obscured by reordering the records within the SSL/TLS transmission. The records can be reordered a number of ways. In some implementations, the records are tagged with a record-order tag that indicates the position of the record in the message stream. In another implementation, the records are tagged with identifiers, and the original order of the identifiers is recorded in a record-order header. The record-order header may be encrypted using a cryptographic key. Once the records are tagged, the records can be rearranged in the stream and transmitted out-of-order, so that in many circumstances, a fingerprint of the transmission is obscured. When the reordered records are received by the recipient, in some implementations, the records are buffered and sorted based at least in part on their record-order tags. In another implementation, the record-order header is used to reestablish the original order of the tags, and the records are sorted according to the order defined by the record-order header.

Figure 18:
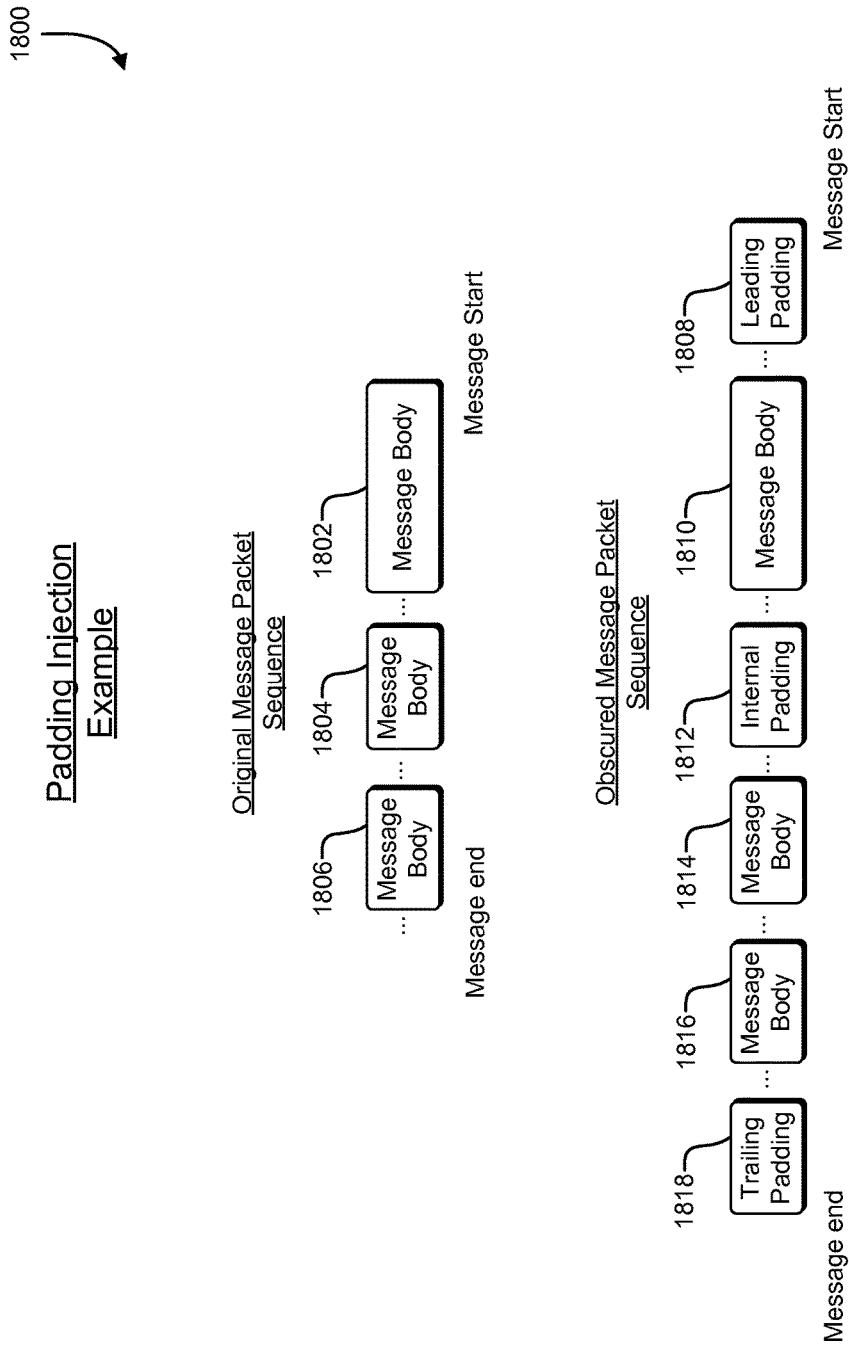
FIG. 18 shows an illustrative example of a message stream and a corresponding obscured message stream that has been obscured by injecting padding, in accordance with an embodiment.

FIG. 18 shows an illustrative example of a message stream and a corresponding obscured message stream that has been obscured by injecting padding, in accordance with an embodiment. A diagram 1800 includes an original message packet sequence having three message-body packets 1802, 1804, and 1806. An obscured message packet sequence below the original message packet sequence illustrates the result of adding padding to the original message packet sequence. The obscured message packet sequence begins with a leading-padding packet 1808, followed by a message-body packet 1810 that corresponds to message-body packet 1802. An internal-padding packet 1812 follows message-body packet 1810. The remaining message-body packets 1814, and 1816, correspond to message-body packets 1804, and 1806. At the end of the obscured message packet sequence, is a trailing-padding packet 1818.

Yet another obscuring capability is padding injection. Padding injection adds data to a transmission. In some implementations, padding injection adds padding-data to particular packets. In another implementation, padding injection adds additional packets of padding-data to a transmission. The addition of padding-data to a transmission can, in some situations, obscure a fingerprint that relies on the size of a transmission. Padding can be added to packet-based messages or stream-based messages. Padding can be added at the beginning of the message, at the end of the message, and internally to the message.

Figure 19:
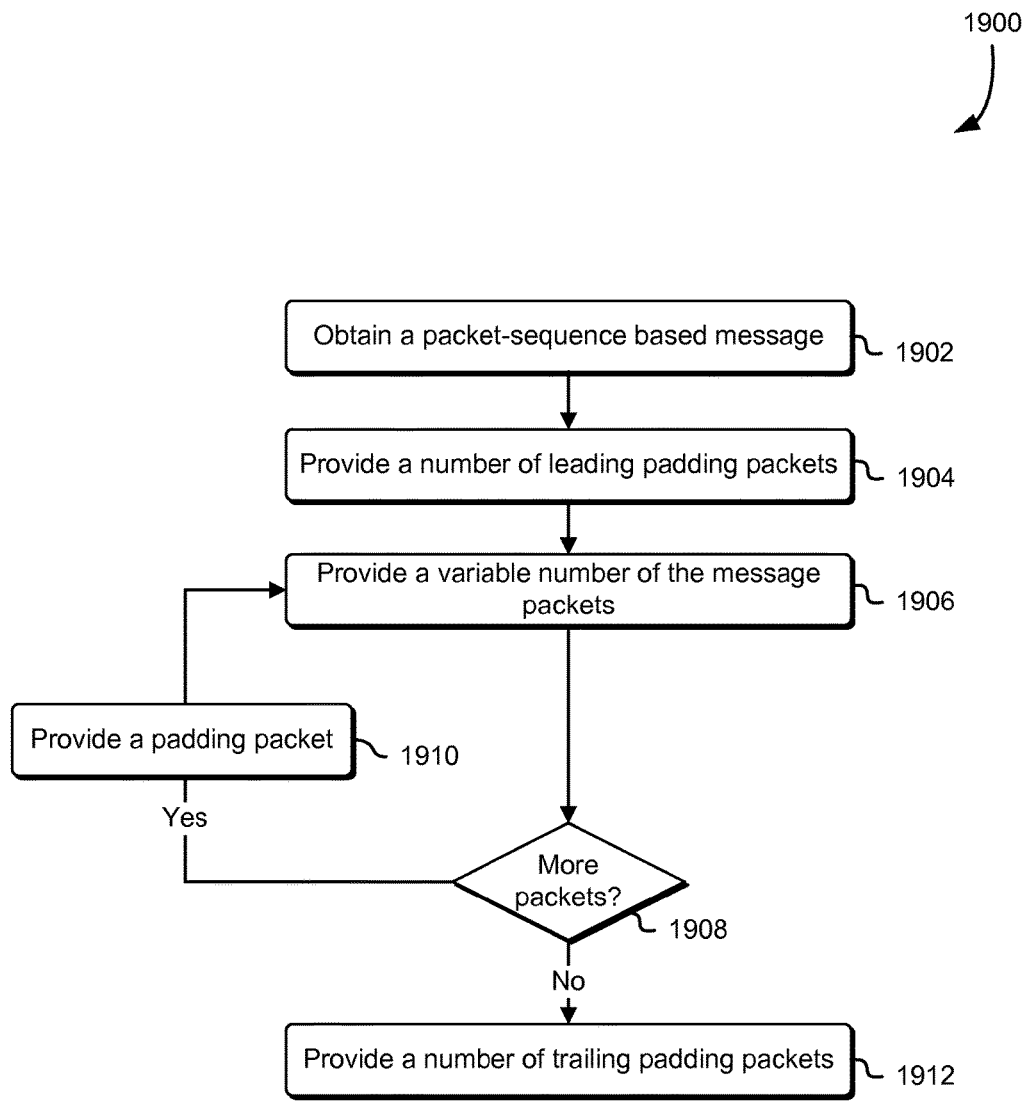
FIG. 19 shows an illustrative example of a process that, when performed by an obscuring engine, obscures a message by injecting padding, in accordance with an embodiment.

FIG. 19 shows an illustrative example of a process that, when performed by an obscuring engine, obscures a message by injecting padding, in accordance with an embodiment. A process 1900 begins at block 1902 where an obscuring engine obtains a packet-sequence-based message. The obscuring engine provides 1904 a number of leading-padding packets. Next, at block 1906, the obscuring engine identifies a variable number of packets from the packet-sequence-based message, and provides the identified packets. When the obscuring engine determines 1908 that additional packets remain to be output from the packet-sequence-based message, execution proceeds to block 1910 where an additional padding packet is provided. When no more packets remain to be output from the packet-sequence-based message, execution proceeds to block 1912 where the obscuring engine provides a number of trailing-padding packets, and the process 1900 is complete.

In some implementations, padding packets are added when the rate of data transmission falls below a threshold value. In another implementation padding packets are added randomly.

Figure 20:
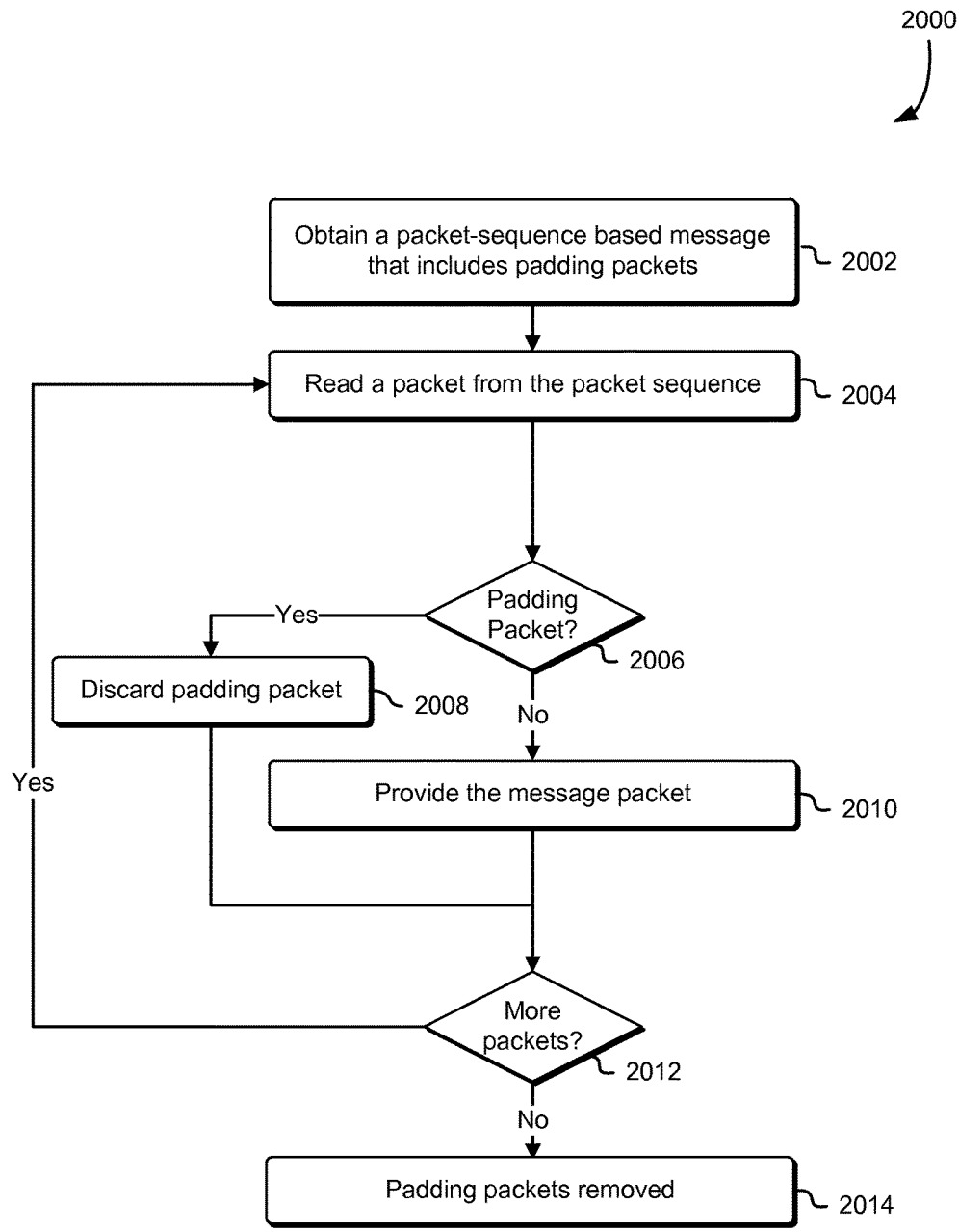
FIG. 20 shows an illustrative example of a process that, when performed by an obscuring engine, un-obscures a message that has been obscured by injecting padding, in accordance with an embodiment.

FIG. 20 shows an illustrative example of a process that, when performed by an obscuring engine, unobscures a message that has been obscured by injecting padding, in accordance with an embodiment. A process 2000 begins at block 2002 when an obscuring engine receives a packet-sequence-based message that includes a number of padding packets. At block 2004, the obscuring engine reads a packet from the packet-sequence-based message. When the obscuring engine determines 2006 that the read packet is a padding packet, execution proceeds to block 2008 and the padding packet is discarded. When the obscuring engine determines 2006 that the read packet is not a padding packet, the obscuring engine provides 2010 the read packet. At decision block 2012, the obscuring engine determines when additional packets remain in the packet-sequence-based message. When there are additional packets, execution proceeds to block 2004 where an additional packet is read. When there are no additional packets, execution proceeds to block 2014 and the process of removing padding packets is complete.

Yet another obscuring capability is cadence modification. The cadence of a transmission describes the rhythm or the timing between packets that make up the data transmission. In some environments, an attacker can use the cadence of the transmission to develop a fingerprint. However, when an obscuring engine performs cadence modification on the transmission, the packet timing of the transmission is altered and the fingerprint is obscured.

Figure 21:
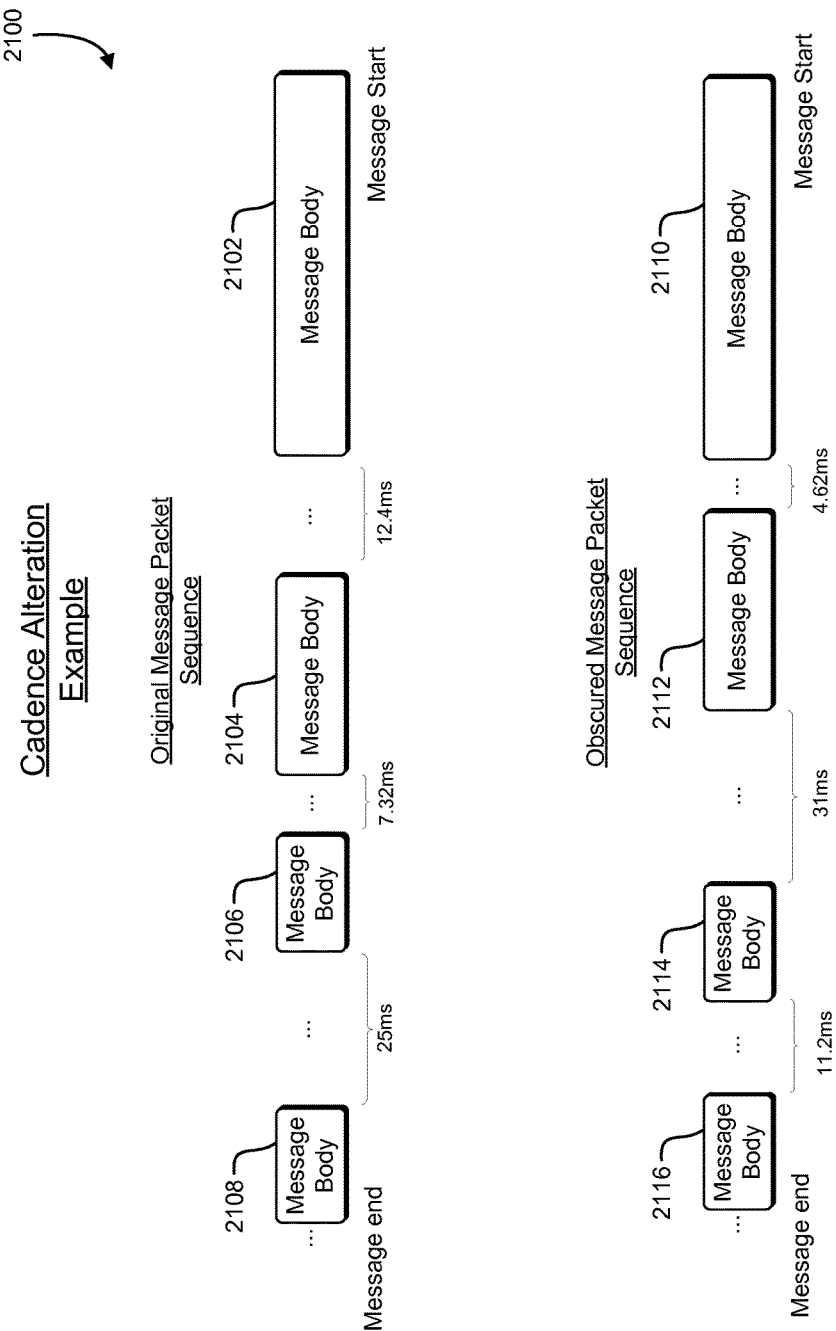
FIG. 21 shows an illustrative example of a message stream and a corresponding obscured message stream that has been obscured by altering the cadence of the transmission, in accordance with an embodiment.

FIG. 21 shows an illustrative example of a message stream and a corresponding obscured message stream that has been obscured by altering the cadence of the transmission, in accordance with an embodiment. A diagram 2100 includes an original message packet sequence and an obscured message packet sequence. The original message packet sequence comprises four message-body packets 2102, 2104, 2106, and 2108. The amount of time between each message-body packet is shown between each message-body packet. For example, the amount of time between message-body packet 2102 and message-body packet 2104 is shown to be 12.4 ms. In the diagram of the obscured message packet sequence, the amount of time between the message-body packets has been altered. For example, the time amount of time between message-body packet 2110 and message-body packet 2112 is 4.62 ms (from 12.4 ms), the amount of time between message-body packet 2112 and message-body packet 2114 is 31 ms (from 7.32 ms), and the amount of time between message-body packet 2114 and message-body packet 2116 is 11.2 ms (from 25 ms).

Figure 22:
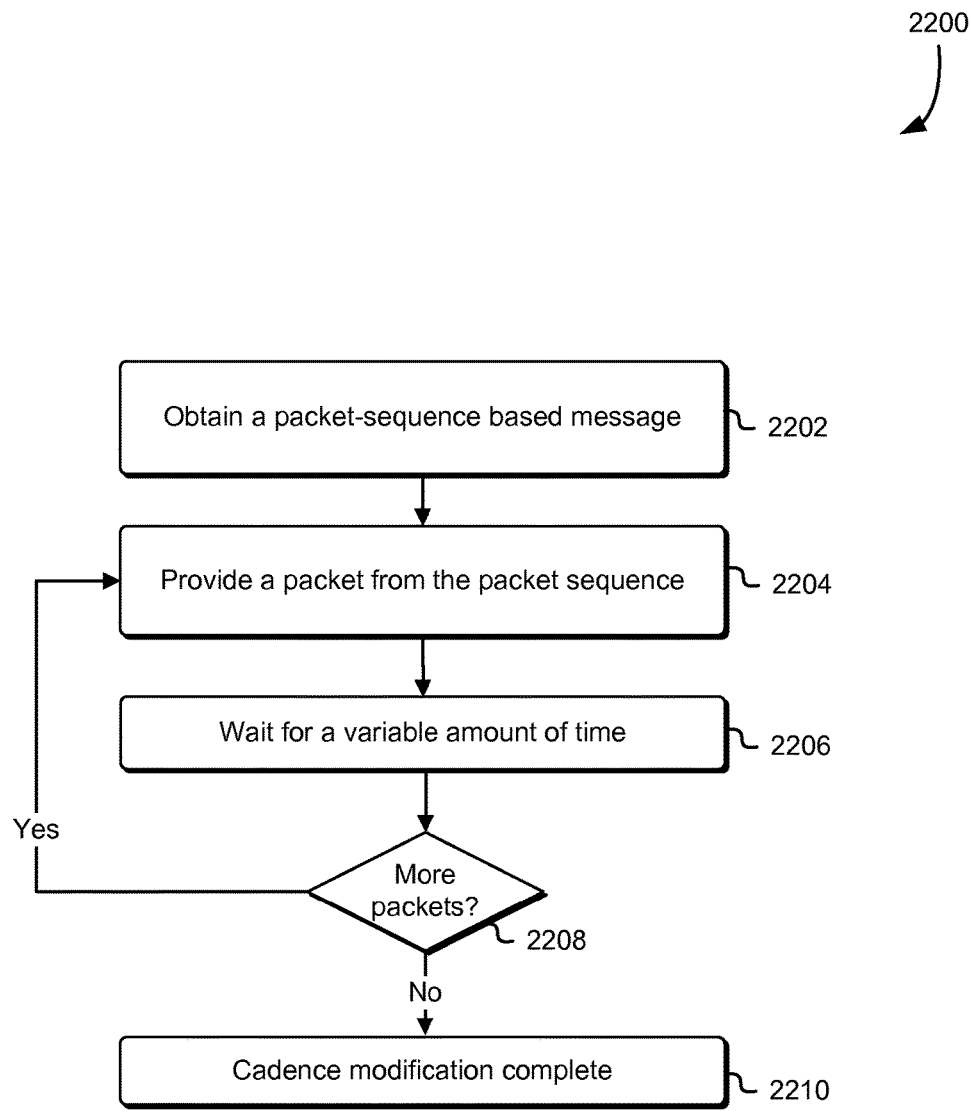
FIG. 22 shows an illustrative example of a process that, when performed by an obscuring engine, obscures a message by altering the cadence of the transmission, in accordance with an embodiment.

FIG. 22 shows an illustrative example of a process that, when performed by an obscuring engine, obscures a message by altering the cadence of the transmission, in accordance with an embodiment. A cadence-modifying process 2200 begins at block 2202 where an obscuring engine obtains a packet-sequence-based message. At block 2204, the obscuring engine extracts a packet from the packet-sequence-based message and provides the extracted packet. Next, at block 2206, the obscuring engine waits for a variable amount of time. In some implementations, the variable amount of time is a bounded pseudorandom time value generated by a random or pseudorandom number generator. For example, a pseudorandom number between zero and 100 ms. In certain implementations, the variable amount of time is based at least in part on the average amount of time between message-body packets in the input packet-sequence-based message. For example, the amount of time can be the average time between input packets plus or minus 50 ms. In another implementation, the variable amount of time is calculated to establish a constant amount of time between message-body packets. For example, the amount of time can be 50 ms between each packet. At decision block 2208, the encrypting engine determines if additional packets are available from the packet-sequence-based message. If additional packets are available, execution returns to block 2204 and an additional packets is extracted from the packet-sequence-based message and output. When additional packets are not available, execution proceeds to block 2210 where the alteration of transmission cadence is complete.

In most implementations, when the cadence of a packet-based transmission is changed by the sender, there is no substantial effect on the message content for the receiver. Therefore, in most implementations, the receiving obscuring engine does not attempt to restore the original cadence of the transmitted message. However, in some implementations, when the cadence of message transmission is preserved, a cadence-header is added to the obscured message packet sequence. The cadence-header contains information relating to a cadence of the original message packet sequence, and is used to restore the original cadence to the obscured message packet sequence.

Figure 23:
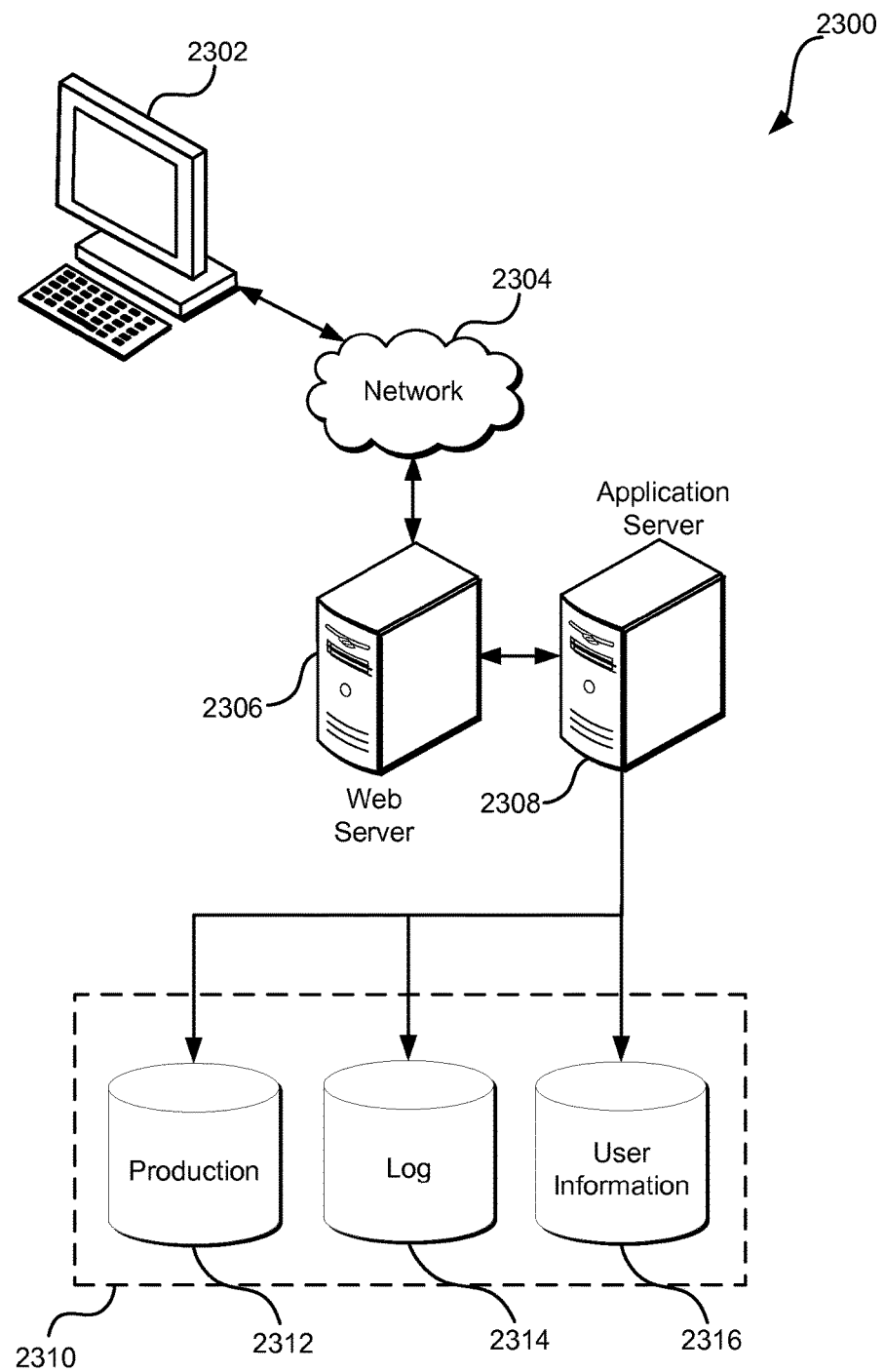
FIG. 23 illustrates an environment in which various embodiments can be implemented.

FIG. 23 illustrates aspects of an example environment 2300 for implementing aspects in accordance with various embodiments. As will be appreciated, although a web-based environment is used for purposes of explanation, different environments may be used, as appropriate, to implement various embodiments. The environment includes an electronic client device 2302, which can include any appropriate device operable to send and/or receive requests, messages, or information over an appropriate network 2304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part on the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 2306 for receiving requests and serving content in response thereto, although for other networks an alternative device serving a similar purpose could be used as would be apparent to one of ordinary skill in the art.

The illustrative environment includes at least one application server 2308 and a data store 2310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 2302 and the application server 2308, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 2310 can include several separate data tables, databases, data documents, dynamic data storage schemes and/or other data storage mechanisms and media for storing data relating to a particular aspect of the present disclosure. For example, the data store illustrated may include mechanisms for storing production data 2312 and user information 2316, which can be used to serve content for the production side. The data store also is shown to include a mechanism for storing log data 2314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2310. The data store 2310 is operable, through logic associated therewith, to receive instructions from the application server 2308 and obtain, update or otherwise process data in response thereto. The application server 2308 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 2302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 23. Thus, the depiction of the environment 2300 in FIG. 23 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Generally, embodiments of the present disclosure may use various protocols, such as a SSL or TLS protocol and extensions thereto, such as defined in Request for Comments ("RFC") 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect ("OSI") model may also be used and/or adapted to utilize techniques described herein. It should be noted that the techniques described herein are adaptable to other protocols such as the Real Time Messaging Protocol ("RTMP"), the Point-to-Point Tunneling Protocol ("PPTP"), the Layer 2 Tunneling Protocol, various virtual private network ("VPN") protocols, Internet Protocol Security ("IPSEC"), and other protocols, such as protocols for secure communication that include a handshake.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
negotiating an encrypted communications session with another computer system;
obtaining data from an application executing on the computer system;
determining a set of obscuration parameters that specify a time between record transmissions for the encrypted communications session;
generating, based at least in part on the data from the application and the determined obscuration parameters, a plurality of records for transmission over the negotiated encrypted communications session;
performing a cadence modification on the plurality of records for transmission by altering the packet sequence timing of the transmission and obscuring a fingerprint of the transmission; and
transmitting the plurality of records in accordance with the set of obscuration parameters by at least separating transmission of individual records of the generated plurality of records in accordance with the specified time.

2. The computer-implemented method of claim 1, wherein:
the plurality of records includes ordering tags on the plurality of records, the tags indicating an ordering of the plurality of records; and
the plurality of records are transmitted in a different order than the ordering indicated by the tags.

3. The computer-implemented method of claim 1, comprising:
generating a partition header, the partition header indicating a partitioning of the plurality of records;
repartitioning the plurality of records; and
transmitting the partition header to the other computer system.

4. The computer-implemented method of claim 1, comprising:
generating a padding record, the padding record including an indication that the padding record includes padding; and
adding the padding record to the plurality of records.

5. A system comprising:
one or more processors; and
a memory storing instructions that, if executed, implement a network client,
wherein the network client:
obtains data;
as part of negotiating an encrypted communications session with another computer system, determines a set of transmission obscuration parameters and a set of data obscuration parameters, the transmission obscuration parameters including a packet timing parameter;
generates obscured data based at least in part on the obtained data and the set of data obscuration parameters;
performs a cadence modification on the plurality of records for transmission by altering the packet sequence timing of the transmission and obscures a fingerprint of the transmission; and
transmits the obscured data as a set of packets over an encrypted communications channel, where individual packets in the set of packets are transmitted in accordance with the packet timing parameter.

6. The system of claim 5, wherein:
the packet timing parameter describes a time interval; and
the obscured data is transmitted as a sequence of packets where each packet in the sequence of packets is separated by the time interval.

7. The system of claim 5, wherein:
the data obscuration parameters include an original location of a cryptographic key located within the data, and a new location different than the original location; and
the cryptographic key is located at the new location within the obscured data.

8. The system of claim 5, wherein:
the transmission obscuration parameters include a data packet partitioning that obscures a fingerprint of the obscured data; and
the obscured data is transmitted as a sequence of packets using the data packet partitioning.

9. The system of claim 5, wherein:
the network client records information that indicates an original packet ordering based at least in part on the data;
the network client transmits the information that indicates the original packet ordering;
the transmission obscuration parameters include a data packet ordering that obscures a fingerprint of the obscured data; and
the obscured data is transmitted as a sequence of packets based at least in part on the data packet ordering.

10. The system of claim 5, wherein:
the network client further generates padding packets;
the data obscuration parameters identify the padding packets; and
the obscured data includes the padding packets.

11. The system of claim 5, wherein:
the network client further receives a list of supported obscuring capabilities from a recipient; and
either the data obscuration parameters or the transmission obscuration parameters are determined based at least in part on the list of supported obscuring capabilities.

12. The system of claim 5, wherein either the data obscuration parameters or the transmission obscuration parameters are determined based at least in part on a ranking of obscuring capabilities.

13. The system of claim 5, wherein the network client:
receives an incoming data transmission that includes obscured data; and
performs an unobscuring operation on the obscured data to produce unobscured data.

14. A non-transitory computer-readable storage medium having stored thereon executable instructions that, as a result of being executed by one or more processors of a computer system, cause the computer system to at least:
obtain data from an application hosted by the computer system;
as part of negotiating an encrypted communications session with another computer system, determine a set of obscuration parameters, the obscuration parameters including a packet timing parameter;
generate obscured data based at least in part on the obtained data and the set of obscuration parameters;
perform a cadence modification on the plurality of records for transmission by altering the packet sequence timing of the transmission and obscures a fingerprint of the transmission; and
transmit the obscured data as a set of packets over an encrypted communications channel, where individual packets in the set of packets are transmitted in accordance with the packet timing parameter.

15. The non-transitory computer-readable storage medium of claim 14, wherein the instructions further comprise instructions that as a result of being executed by the one or more processors, cause the computer system to at least:
perform an unobscuring operation on data received from the another computer system that reverses a complimentary obscuring operation performed by the another computer system.

16. The non-transitory computer-readable storage medium of claim 14, wherein the instructions further comprise instructions that, as a result of being executed by the one or more processors, cause the computer system to at least:
identify a cryptographic key in the obscured data; and
relocate the cryptographic key to a new location in the obscured data.

17. The non-transitory computer-readable storage medium of claim 14, wherein:
the data includes a sequence of records that are arranged with a particular record partitioning; and
the obscured data does not have the particular record partitioning.

18. The non-transitory computer-readable storage medium of claim 14, wherein:
the data includes a sequence of records in a particular order; and
the computer system reorders the records.

19. The non-transitory computer-readable storage medium of claim 14, wherein the set of obscuration parameters is established as part of a Transport Layer Security handshake.

20. The non-transitory computer-readable storage medium of claim 14, wherein transmitting the obscured data modifies timing between packets that is associated with transmission of the obscured data.

* * * * *